United States Patent [19]
Koval et al.

[11] Patent Number: 5,339,413
[45] Date of Patent: Aug. 16, 1994

[54] DATA STREAM PROTOCOL FOR MULTIMEDIA DATA STREAMING DATA PROCESSING SYSTEM

[75] Inventors: Michael J. Koval; William W. Lawton, both of Boca Raton; John G. Tyler, Boynton Beach; Scott L. Winters, Plantation, all of Fla.

[73] Assignee: International Business Machines Corporation, Armonk, N.Y.

[21] Appl. No.: 934,069

[22] Filed: Aug. 21, 1992

[51] Int. Cl.⁵ .................................... G06F 13/00
[52] U.S. Cl. ........................ 395/650; 364/DIG. 1; 364/239.1; 364/239.7; 364/281.7
[58] Field of Search ................. 395/154, 650, 250

[56] References Cited

U.S. PATENT DOCUMENTS 5,251,209 10/1993 Jurkevich et al. ................. 370/82
5,297,249 3/1994 Bernstein et al. ............ 364/DIG. 1

Primary Examiner—Thomas M. Heckler
Attorney, Agent, or Firm—Bernard D. Bogdon

[57] ABSTRACT

A data stream is created for moving data from a source to a target in accordance with a stream protocol defined by controlling stream protocol control blocks (SPCBs) created from a predefined source SPCB and a predefined target SPCB. The controlling SPCBs include information establishing a plurality of data buffers that are used to efficiently stream or transfer data on a real-time basis. The controlling SPCBs are formed by a process of negotiation in which differences between the source and target SPCBs are reconciled in accordance with rules of negotiation. Once the data stream is created, it is then started by the application program and data is streamed until an end of stream is reached.

18 Claims, 16 Drawing Sheets

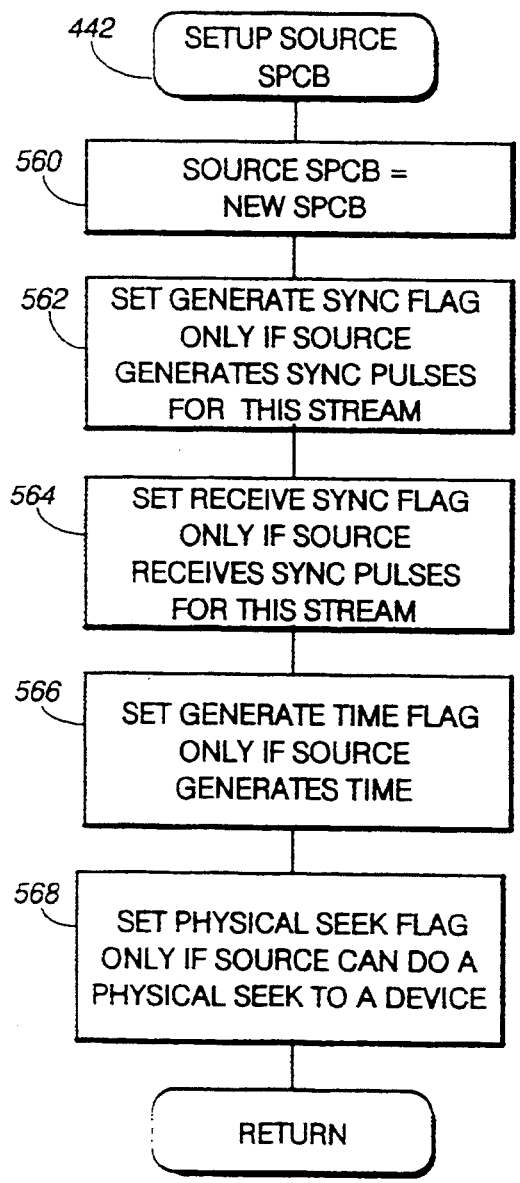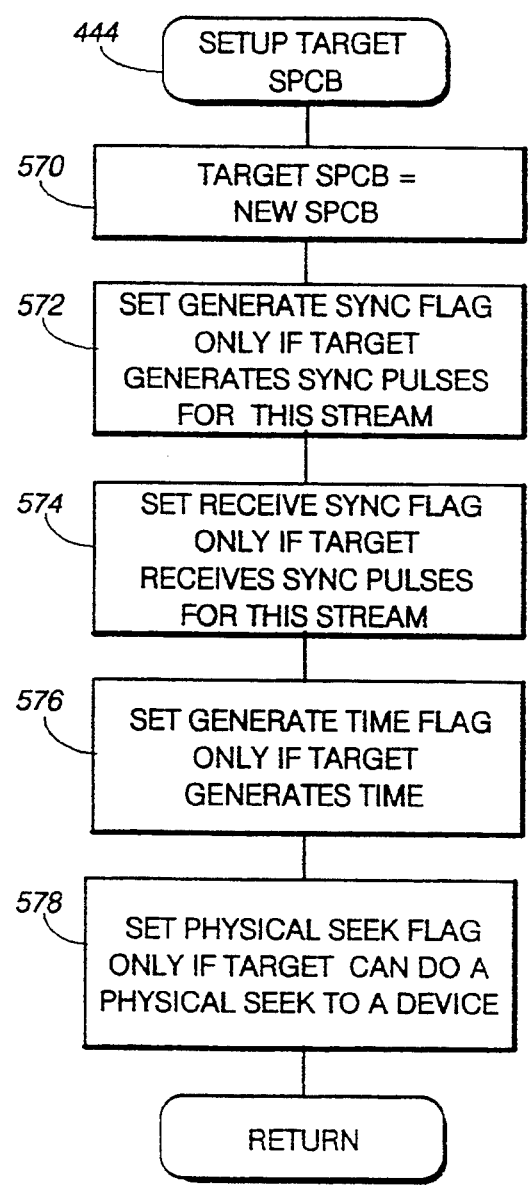

DATA STREAM PROTOCOL FOR MULTIMEDIA DATA STREAMING DATA PROCESSING SYSTEM

RELATED APPLICATIONS

The following applications, which are assigned to the same assignee of this application and are hereby incorporated herein by reference, are related:

(1) "PERSONAL COMPUTER WITH GENERALIZED DATA STREAMING APPARATUS FOR MULTIMEDIA DEVICES" Ser. No. 07/816,517, filed Dec. 31, 1991, by C.A. Dinallo et al, abandoned; and (2) "SYNCHRONIZATION TECHNIQUES FOR MULTIMEDIA DATA STREAMS", Ser. No. 07/815,652, filed Dec. 31, 1991, by M.J. Koval et al.

BACKGROUND OF THE INVENTION

A multimedia data processing system is designed to present various multimedia materials in various combinations of text, graphics, video, image, animation, sound, etc. Such a system is a combination of hardware and software. The hardware includes a personal computer to which various multimedia devices can be attached. The hardware runs under the control of an operating system and multimedia application programs.

Multimedia applications impose heavy demands on the operating system to move large amounts of data from device to device, from system memory to a device, or vice-versa, in a continuous, real-time manner. Multimedia systems must support a flexible yet consistent means for transporting these large data objects, and control this activity accurately in real time. Adding new multimedia devices and data types should require minimal, if any, new system extension code. The total real memory requirements at run time must be minimized, so that system performance is not degraded. Also, support for complex data types and devices that manipulate interleaved data objects, must be provided. Finally, it must be possible to implement each multimedia data transport control means at the most appropriate system privilege level. Operating system extensions that support multimedia data types and devices must provide the ability to control the many different multimedia I/O devices and to transport, or stream, large multimedia data objects within real-time constraints.

Multimedia applications control the input and output of large amounts of data, including the continual display of bitmaps, output of digitized audio waveforms or MIDI audio sequences, input of digitized audio from an analog microphone or line source, etc. Applications control the data flow in the context of a real-time clock: certain events under program control occur at explicitly defined points in time, and these points are defined very accurately (e.g., in milliseconds).

Given only OS/2 control program services such as DOS calls, or similar services in other operating systems such as AIX or UNIX, controlling the level of function at the application programming interface requires highly complex, device-specific, data transport control modules. Even if such modules are created, there is no guarantee that the threads controlling each I/O operation would execute within their required time intervals. To address this problem, the application needs to add sophisticated semaphore logic and make the I/O control threads time critical. The nature of multitasking operating systems, combined with the high data throughput load common to multimedia applications, will at times prevent data from being delivered to the destination device within the allotted time interval. Failing to meet these real-time requirements results in visible or audible defects in the multimedia presentation.

A system solution for controlling many heterogeneous, multimedia hardware devices requires consistent support for widely divergent data types and real-time-dependent system response capabilities. The system must provide the capability to manage different device specific and data type specific behaviors in a generalized, consistent, device and data type independent interface. The ability of applications to readily control (i.e. tune) these behaviors, where necessary, is also a key requirement. The invention is directed to a multimedia data streaming protocol which overcomes the above difficulties meets the above criteria and objectives set forth hereinafter.

SUMMARY OF THE INVENTION

One of the objects of the invention is to provide an improved multimedia data streaming protocol by means of which the ability to control many heterogeneous multimedia hardware devices is accomplished using minimum system resources and at the same time provides for all the data specific controls needed through a device independent interface.

Another object of the invention is to establish a stream protocol for a specific stream, as such stream is created, from a plurality of predefined stream protocol control blocks (SPCBs) that contain information from which the specific stream protocol can be derived.

Still another object of the invention is to create a controlling SPCB from source and target SPCBs by a process of negotiation.

Another object of the invention is to handle a SPCB so as to allow dynamic protocol binding to occur when a stream handler is loaded thus relieving the stream handler from having such control blocks included with a dynamic link library (DLL) or physical device driver (PDD).

A still further object of the invention is to provide additional protocol flexibility by allowing an application program to query, install and deinstall a SPCB at run time to fine tune the protocol to the specific operating environment that currently exists on the system.

A further object of the invention is to provide a stream protocol system in which new data types can be added and supported at run time without changing stream handlers.

A further object of the invention is to provide an SPCB which enables data stream buffers to be created, allocated, locked, and unlocked without any intervention by applications or other higher level software entities.

Still another object is to provide an improved SPCB which controls the size of and how many stream buffers are allocated, the number of buffers allowed to remain free during streaming to control for data transfer latencies (i.e., the "high water mark") and the number of buffers which are always in use during streaming (i.e., the "low water mark").

Briefly, in accordance with the invention, a data stream is created for moving data from a source to a target in accordance with a stream protocol defined by controlling SPCBs created from a predefined source handler SPCB and a predefined target handler SPCB.

The controlling SPCBs include information establishing a plurality of data buffers that are used to efficiently stream or transfer data in real-time.

DRAWINGS

Other objects and advantages of the invention will be apparent from the following description taken in connection with the accompanying drawings wherein:

FIG. 12 is a flow chart of a routine to setup a source SPCB;

FIG. 13 is a flow chart of a routine to setup a target SPCB;

DETAILED DESCRIPTION

MULTIMEDIA SYSTEM

Figure 1:
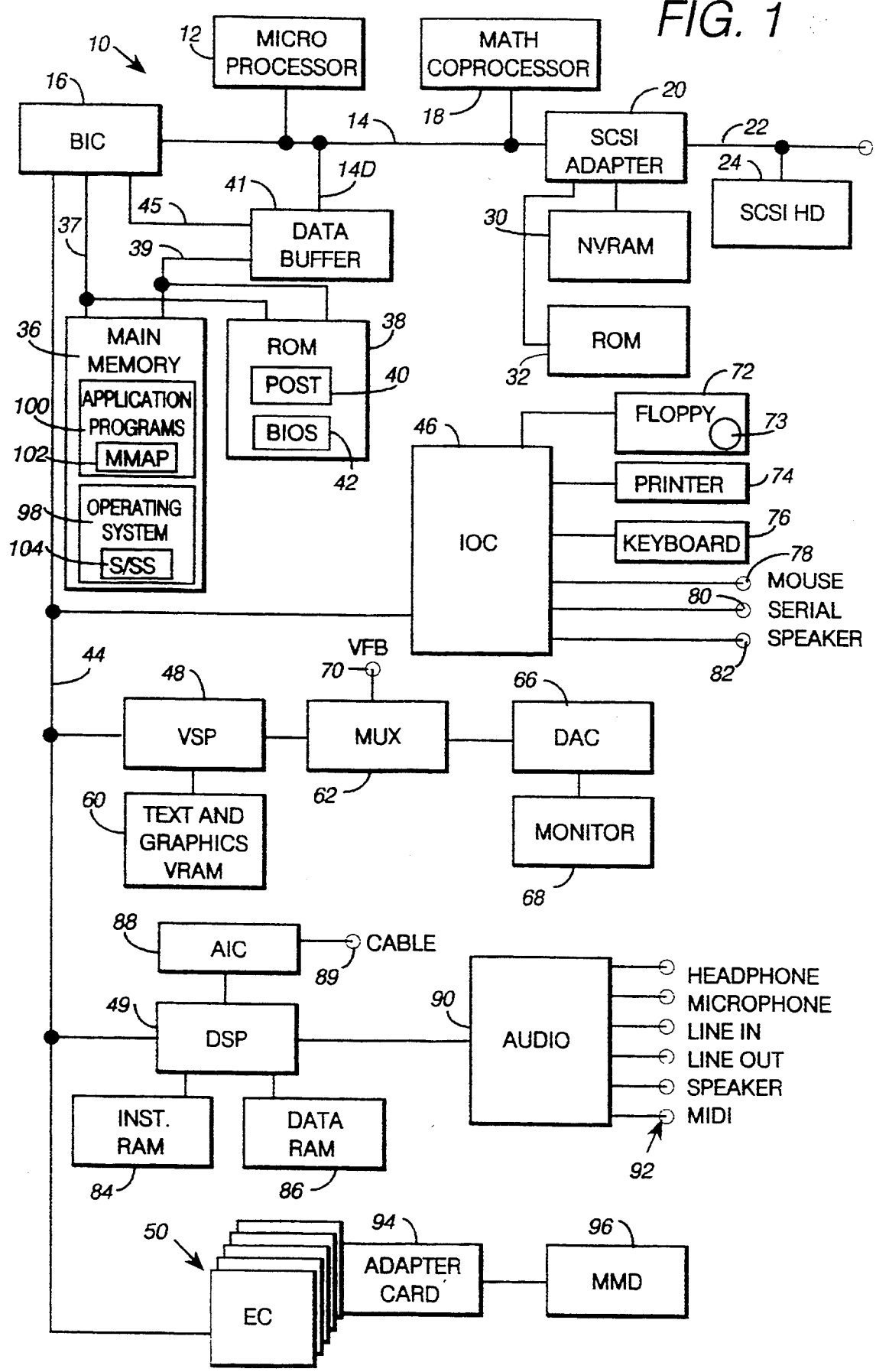
FIG. 1 is a block diagram of a data processing system embodying the invention.

Referring now to the drawings, and first to FIG. 1, there is shown an exemplary data processing system comprising a personal computer 10 operable under a multitasking operating system such as OS/2 Version 2.0, to execute application programs. Computer 10 comprises a microprocessor 12 connected to a local bus 14 which, in turn, is connected to a bus interface controller (BIC) 16, a math coprocessor 18, and a small computer system interface (SCSI) adapter 20. Microprocessor 12 is preferably one of the family of 80xxx microprocessors, such as an 80386 or a 80486 microprocessor, and local bus 14 includes conventional data, address, and control lines conforming to the architecture of such processor. Adapter 20 is also connected to a SCSI bus 22 which is connected to a SCSI hard drive (HD) 24 designated as the C:drive, the bus also being connectable to other SCSI devices (not shown). Adapter 20 is also connected to a non-volatile random access memory (NVRAM) 30 and to a read only memory (ROM) 32.

BIC 16 performs two primary functions, one being that of a memory controller for accessing a main memory 36 and a ROM 38. Main memory 16 is a dynamic random access memory (RAM) that stores data and programs for execution by microprocessor 12 and math coprocessor 18. ROM 38 stores a POST program 40 and a BIOS 42. POST program 40 performs a standard power-on, self-test of the system when computer 10 is started by turning the power on or by a keyboard reset. An address and control bus 37 connects BIC 16 with memory 36 and ROM 38. A data bus 39 connects memory 36 and ROM 38 with a data buffer 41 that is further connected to data bus 14D of bus 14. Control lines 45 interconnect BIC 16 and data buffer 41.

The other primary function of BIC 16 is to interface between bus 14 and an I/O bus 44 designed in conformance with Micro Channel (MC) architecture. Bus 44 is further connected to an input/output controller (IOC) 46, a video signal processor (VSP) 48, a digital signal processor (DSP) 49, and a plurality of expansion connectors (EC) or slots 50. VSP 48 is further connected to a video RAM (VRAM) 60 and a multiplexor (MUX) 62. VRAM 60 stores text and graphic information for controlling what appears on the screen of a monitor 68. MUX 62 is further connected to a digital to analog converter (DAC) 68 and to a connector or terminal 70 that is connectable to a video feature bus (VFB). DAC 66 is connected to monitor 68 that provides a conventional output screen or display for viewing by a user.

IOC 46 controls operation of plurality of I/O devices including a floppy disc drive 72 designated as the A:-drive, a printer 74, and a keyboard 76. Drive 72 comprises a controller (not shown) and a removable floppy disc or diskette 73. IOC 46 also is connected to a mouse connector 78, a serial port connector 80, and a speaker connector 82 which allow various optional devices to be connected into the system.

DSP 49 is further connected to an instruction RAM 84, a data RAM 96, an analog interface controller (AIC) 88, and an audio controller (90). RAMs 84 and 86 respectively hold instructions and data used by DSP 49 for processing signals. Audio controller 90 controls various audio inputs and outputs and is connected to a plurality of connectors 92 by which various devices can be connected to the system. Such devices include a headphone, a microphone, a speaker, a musical instrument digitizing interface (MIDI), and devices requiring audio line-in and line-out functions. Various other multimedia devices (MMD) 96 can be also attached to the system through an EC 50 and adapter card 94.

Memory 36 stores various programs for execution in the system, which programs include application programs 100, including multimedia application programs (MMAP) 102, and an operating system 98 having extensions thereto including a sync/stream sub-system (S/SS) 104. It is to be noted that while FIG. 1 illustrates an exemplary multimedia system, the operating system is general purpose and is designed to run or control data processing systems having configurations that are different from the one shown in FIG. 1. The invention is embodied primarily in S/SS 104 and its interaction with operating system 100, which will now be described.

SYNC/STREAM SUB-SYSTEM

Figure 2:
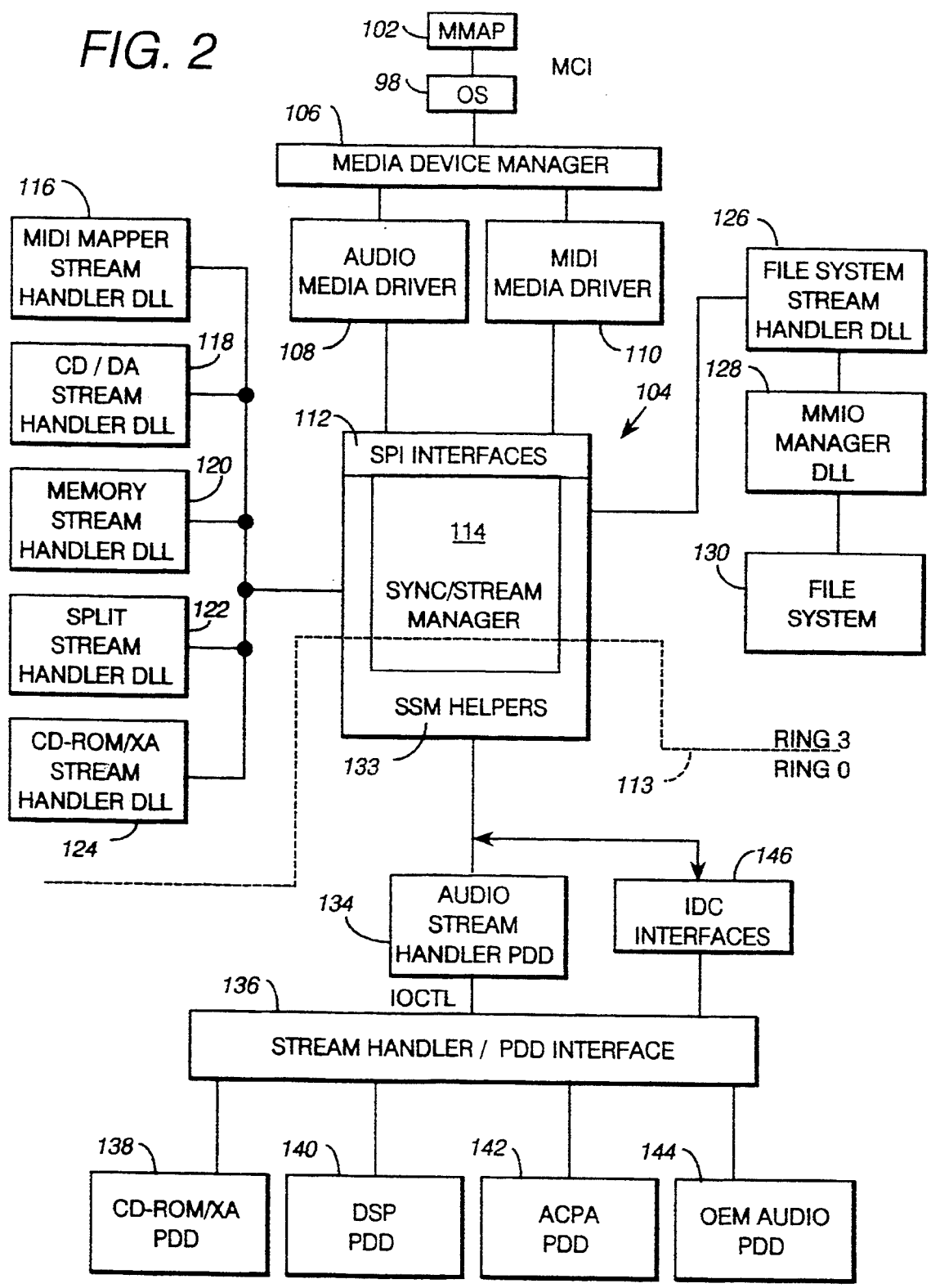
FIG. 2 is a block diagram of sync/stream subsystem architecture embodied in the system shown in FIG. 1.

Referring to FIG. 2, multimedia application programs (MMAP) 102 execute at a layer above operating system (OS) 98 and communicate through multimedia control interface (MCI) by sending MCI commands for controlling devices in the multimedia environment. Some of the basic commands are pause, play, record, resume, seek, save, set, stop, etc. Such commands are routed by the operating system 98 to a media device manager (MDM) 106. The application programing model for MMAPs is a logical extension of the OS/2 Presentation Manager programming model, incorporating both object oriented messaging constructs and procedural (call and return) programming interfaces. The MCI provides a view to application developers and users similar to that of a video and audio home entertainment system. Operations are performed by controlling the media information processors known as media devices. Media devices are internal or external hardware devices, or software libraries that perform a defined set of operations by manipulating lower-level hardware components and system software functions. Multiple media devices may be included in a scenario, and allocated and controlled as a group for the purpose of synchronized playback.

Multimedia applications must control two aspects of real time system behavior, the transfer of large amounts of data from one device to another and the synchronization of events that are related. Events under the control of the program must be perceived to be under the direct control of the user, and the underlying system functions facilitate and ensure that these events occur in a predictable, real-time manner. Multimedia application authors write programs that operate on a real-time clock basis, rather than an approximate clock that could allow events to occur within windows of probability.

The MCI has two levels of dynamic link libraries (DLLs) comprising MDM 106 and media drivers including an audio media driver 108 and a MIDI media driver 110. MDM 106 provides resource management for media devices. It resolves contention for access to media devices and provides an application developer a view of resources that is independent of hardware. The media drivers are dynamic link libraries that implement the functionality of media devices. Media drivers invoke the services of hardware devices or software to implement their functionality. The media drivers do not directly control the hardware devices. Instead, they pass commands to S/SS 104 through a stream programming interface (SPI) 112 to a sync/stream manager (SSM) 114 which controls synchronization and streaming activities. SSM 114 performs two primary functions, the first being to control data streaming to provide continuous, real-time data streaming the inventive aspects of which are the subject of the above-identified related application (1). The second primary function involves synchronizing data streams and the details of such function are covered by the above-identified related application (2).

Stream handlers are required at both the system kernel level and the application level. Some data streams are best controlled by a direct connection between a stream handler and the physical device driver at a Ring 0 privilege level Such stream handler communicates with the PDD using a common interface based on OS/2 Interdevice Driver Communication (IDC). Other data streams are not associated with a data source or target that can be mapped to a specific physical device and can be controlled at a Ring 3 privilege level by a DLL. Dotted line 113 generally indicates which items operate at the different privilege levels. Within SSM 114, some routines operate at one level and other routines operate at the other level, as appropriate to the task at hand.

Each stream handler is programmable and is capable of streaming according to stream protocols. A "stream handler" is a set of code that handles either source or target specific actions for a device class specific data stream (i.e. audio or video). The stream handler is data type independent. It can be either a DLL or a PDD and interfaces with the Sync/Stream manager as well as a device driver or the file system of the operating system.

From the perspective of SSM 114, all stream handlers have similar responsibilities. Each handler is designed to be the source or target for one or more data streams where each data stream moves data independently. Manager 114 is responsible for connecting a stream source to an appropriate stream target, for maintaining data flow, and for cleaning up the various resources when the stream has ended. Further, the stream handlers are not device dependent modules. Although each stream handler supports streaming data of specific predefined types, data is passed from one handler to the next without any knowledge of hardware behavior. Also, audio stream handler 134 can communicate with any compatible audio device PDD in a completely hardware independent manner. To be compatible, the PDD must conform to the IDC interface as well as to the standard audio device driver interface IOCTL. Thus as shown, stream manager 114 interacts with a plurality of stream handler dynamic link libraries (DLL) 116–126 which respectively are MIDI mapper, CD/DA, memory, split stream, CD-ROM/XA, and file system, stream handlers. File system stream handler DLL 128 calls a multimedia I/O (MMIO) manager for accessing a file system 130.

Stream manager 114 also interacts through stream manager helpers 133 with an audio stream handler physical device driver (PDD) 134 that selectively accesses physical devices through a stream handler/PDD interface 136 and a plurality of PDDs 138–144. Stream manager 114 can also interact with interface 136 through inter-device communication (IDC) interfaces 146.

DATA STREAM MODEL

Figure 3:
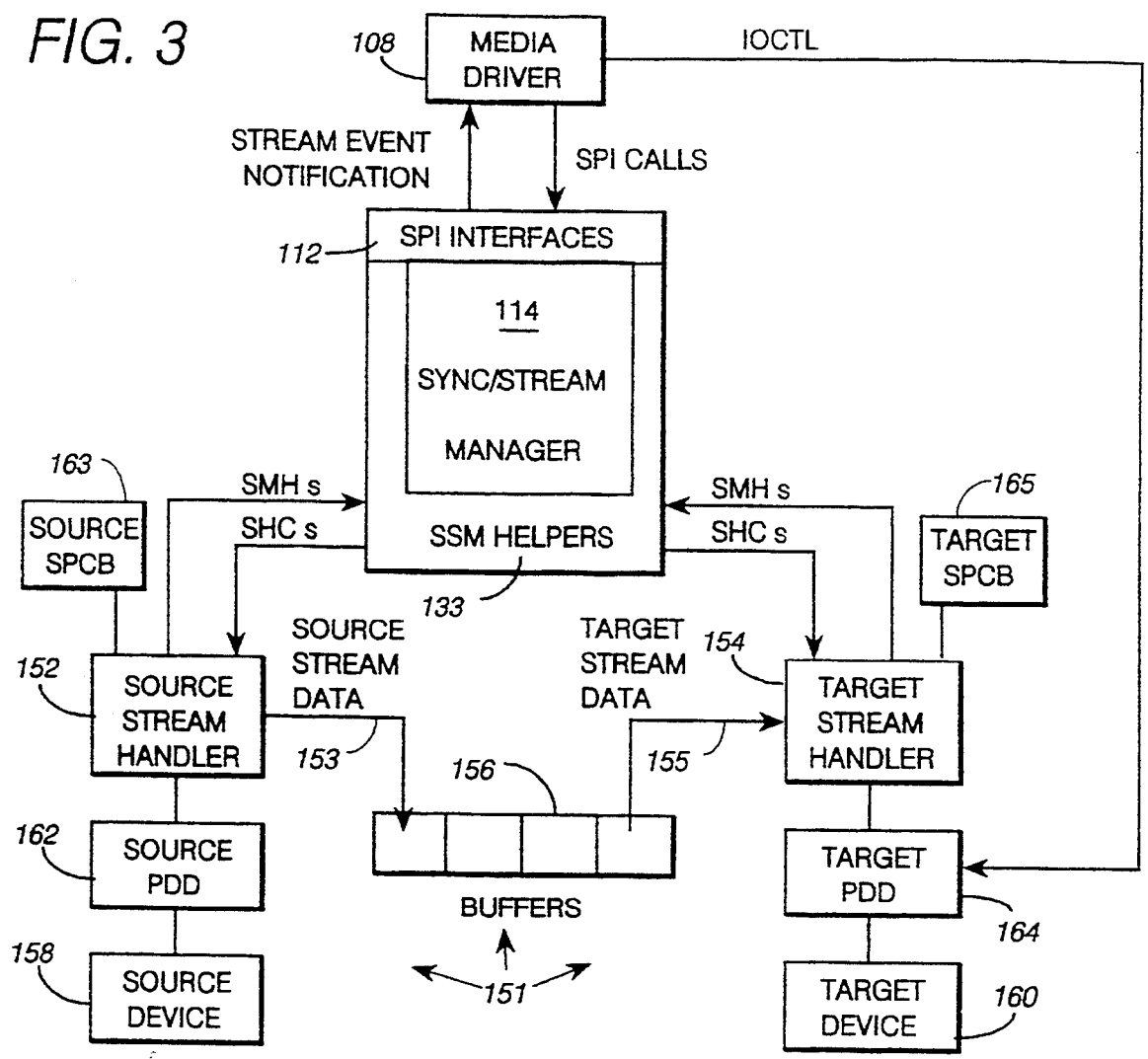
FIG. 3 is a block diagram illustrating a generalized model of data streaming.

FIG. 3 is a generalized model of data streaming operations. Each complete data stream comprises six elements: a source data object or device, a source stream handler, a target stream handler, stream protocol, stream buffers, and a target data object or device. The stream protocol includes a controlling, negotiated stream protocol control block (SPCB) associated with each handler. FIG. 3 shows generally a single data stream 151 and how data flows or is transported under the control of stream manager 114, source and target stream handlers 152 and 154, and SPCBs 163 and 165. A plurality of stream buffers 156 are allocated in memory for use in streaming. Buffers 156 are filled with stream data from a source device 158 and are emptied of stream data by transmitting the data to a target device 160. Data stream 151 comprises two paths, a source stream data path 153 and a target stream data path 155. The data path for the source stream data is from source 158, through source PDD 162, and through stream handler 152 to buffers 156. The data path for the target stream data 155 is from buffers 156, through target stream handler 154, through target PDD 164, and to target device 160. Source stream handler 152 actuates a source PDD 162 which in turn controls operation of the source device. Target stream handler 154 actuates a target PDD 164 which controls target device 160. The general objective is for the source stream handler 152 to fill at least two of stream buffers 156 before the target device is started, and, once the target device has started, to thereafter keep ahead of the target device by filling buffers 156 until the complete source data has been transferred. After the buffers are filled, the target stream handler can then obtain target data therefrom and transfer it to the target device.

Media driver 108 interacts with SPI interface 112 by sending SPI functions or calls and receiving stream event notifications. Manager 114 interprets the SPI calls and in response thereto performs the desired functions by interacting with the stream handlers by sending system helper commands SHCs to the handlers and receiving stream manager helpers SMH calls from the handlers. Media driver 108 can also directly control PDD 164 by issuing control functions defined by standard IOCTL commands. The principal SPI calls related to the invention are SpiCreateSream and SpiStartStream which respectively setup up the desired stream(s) and then start the data streaming. Should there be plural streams that must be synchronized, a SpiEnableSync call is made, as more fully discussed in the related application (2).

Figure 4:
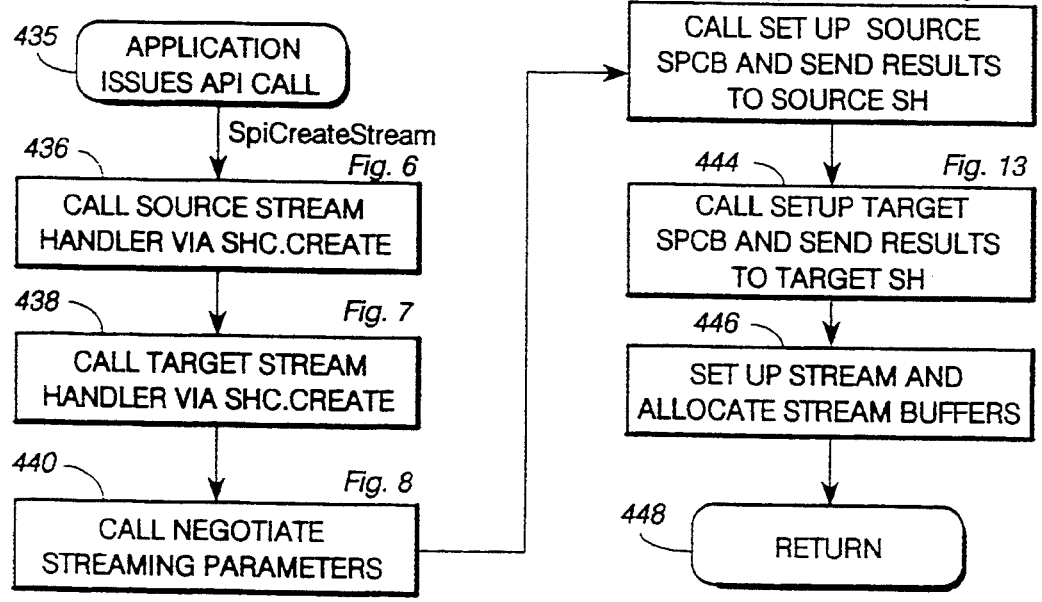
FIG. 4 is a flow chart illustrating steps for creating a data stream.

When a MultiMedia application determines that data will be streamed between devices, then it issues a SpiCreateStream call, which results in the stream being created. The caller specifies source and target stream handler IDs, source and target device specific information, and the stream data type. With reference to FIG. 4, when an application program issues an SpiCreateStream call in step 435, control passes to sync/stream manager 114 which in step 436 calls the source stream handler using the handler command SHC.CREATE. Then, the target stream handler is called using SHC.CREATE in step 438. Step 440 negotiates the streaming parameters which include buffer numbers and size, data stream type, maximum number of records per buffer, minimum number of buffers needed to maintain a constant data stream, number of empty buffers needed to start source stream handler, number of full buffers needed to start target stream handler, etc. Step 442 calls a routine to create source SPCB 163 and then informs the source stream handler of the stream parameters. Step 444 calls a routine to create target SPCB 165 and informs then target stream handler of the stream parameters. Step 446 sets up the stream, and dynamically allocates stream buffers 156 and locks such buffers in memory so the buffers cannot be paged out. The dynamic allocation of memory during stream creation (at create time) prevents the need to perform allocations of physical memory when the stream is active, which could result in disrupting the data flow and affecting the real-time performance of the system. Step 448 returns to the application.

During steps 436 and 438, SSM 114 notifies each of the two stream handlers 152 and 154 that a stream is being created, and each stream handler returns a valid SPCB to SSM 114. Then, SSM 114 negotiates the parameters of the stream and notifies (i.e., return the negotiated SPCB to the handler) the handlers by a SHC_NEGOTIATE_RESULT call to each handler. Negotiation consists of determining which SPCB parameters both stream handlers can mutually accept. The stream handlers then program or set themselves to operate in accordance with such streaming parameters. Further details of stream creation and starting, and of the negotiations are discussed hereinafter.

Typically, SSM 114 allocates buffers for the stream, but it is possible to use application buffers directly. A SPCBBUF_USERPROVIDED flag in the SPCB indicates whether to use provided buffers or to allocate buffers. This is useful for streaming to or from the memory stream handler. In a split stream situation, a particular stream may not allocate its own buffers, but use the buffers of another stream. In other words, share buffers. This is useful for interleaved data that comes from one source but goes to more than one destination.

For SSM 114 allocated buffers, stream buffer allocation is done during stream creation. The numbers of buffers to allocate is taken from the "negotiated" SPCB. The buffers are allocated and then locked so that they will not be paged out to disk. The buffers are unlocked and freed upon an SpiDestroyStream request. These buffers are available at ring 3 in the process linear space and ring 0 in global linear system memory. SSM 114 provides GDT selectors to allow ring 0 stream handlers to access the buffer memory. The stream handler can assume that SSM 114 manages the GDT selectors used.

Both handlers 152 and 154 (source and target) share access to the buffers allocated by the stream manager. Note that if the minimum buffer space (specified in the SPCB) is not available, the stream creation will fail. The allocation of memory at create time prevents the need to perform allocations of physical memory when the stream is active, which could result in disruption of data flow affecting the real-time performance of the stream. Therefore, it is advantageous to allow SSM 114 to allocate buffers and lock them at stream creation time instead of providing buffers to SSM 114 that probably can not be locked at stream creation time, but locked at stream run time.

Figure 5:
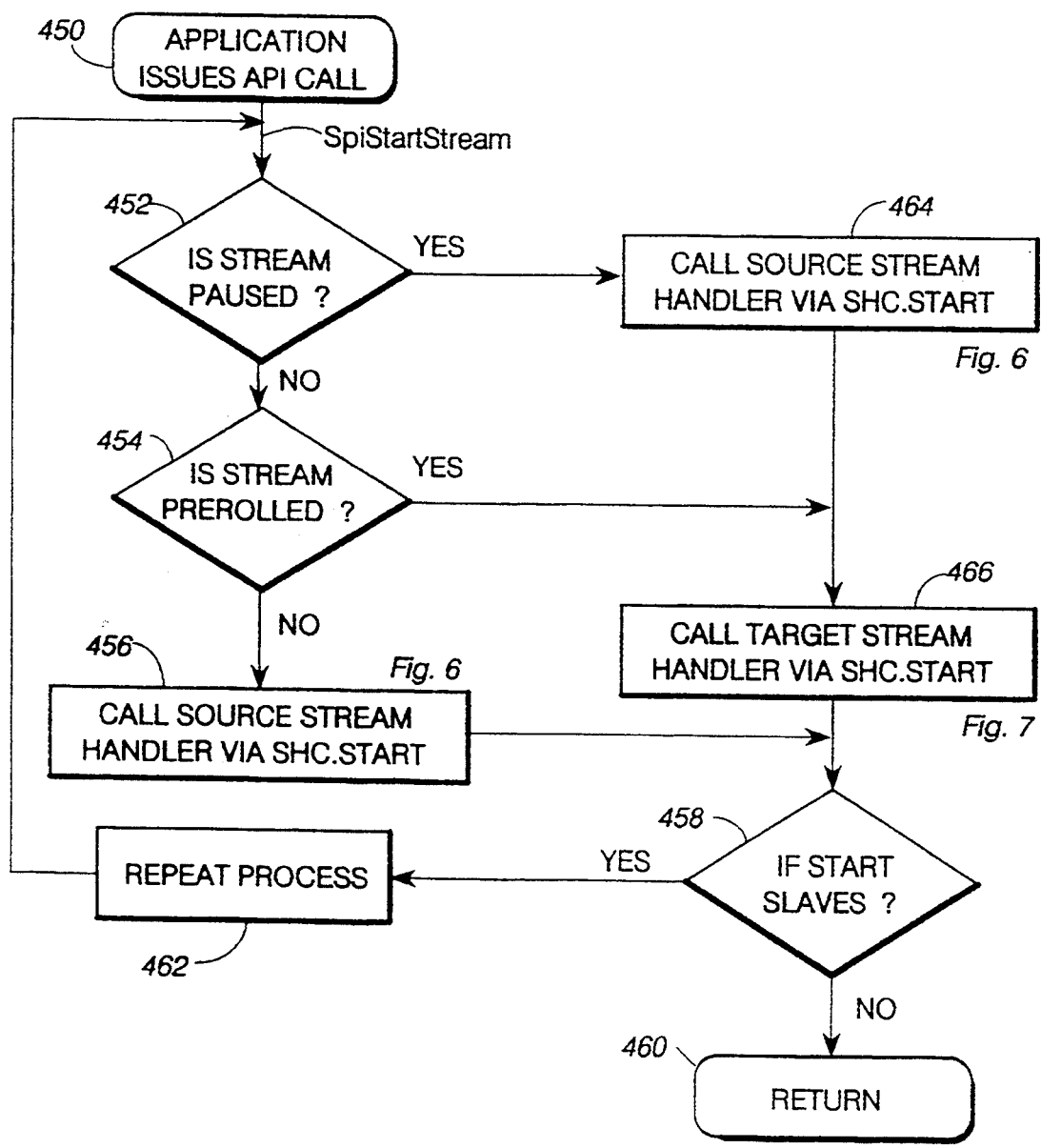
FIG. 5 is a flow chart illustrating steps for starting stream operations.

Referring to FIG. 5, after the data stream has been created, the application program can start data streaming by issuing astart streaming call SpiStartStream in step 450. In response to such call, control passes to manager 114. SSM 114 executes a SpiStartStream routine which first checks in step 452 to see if the stream is paused. A stream is "paused" when data is kept in the stream buffers and the stream is blocked. If the stream is not paused, step 454 determines if the stream is prerolled. If not, step 456 calls the source stream handler with the command SHC.START to unblock the source thread. Then step 458 checks to see if the stream is a slave stream in a sync group. If not, step 460 returns to the application program. If so, step 462 branches back to step 452 to repeat process for each slave stream. If step 452 answers "yes", step 464 calls the source stream handler with a SHC.START command to unblock the source stream thread and then makes a call in step 466 to unblock the target stream handler thread. Step 466 also follows a "yes" result from 454. Step 458 then follows step 466. When both handler threads are unblocked, streaming commences.

Figure 6:
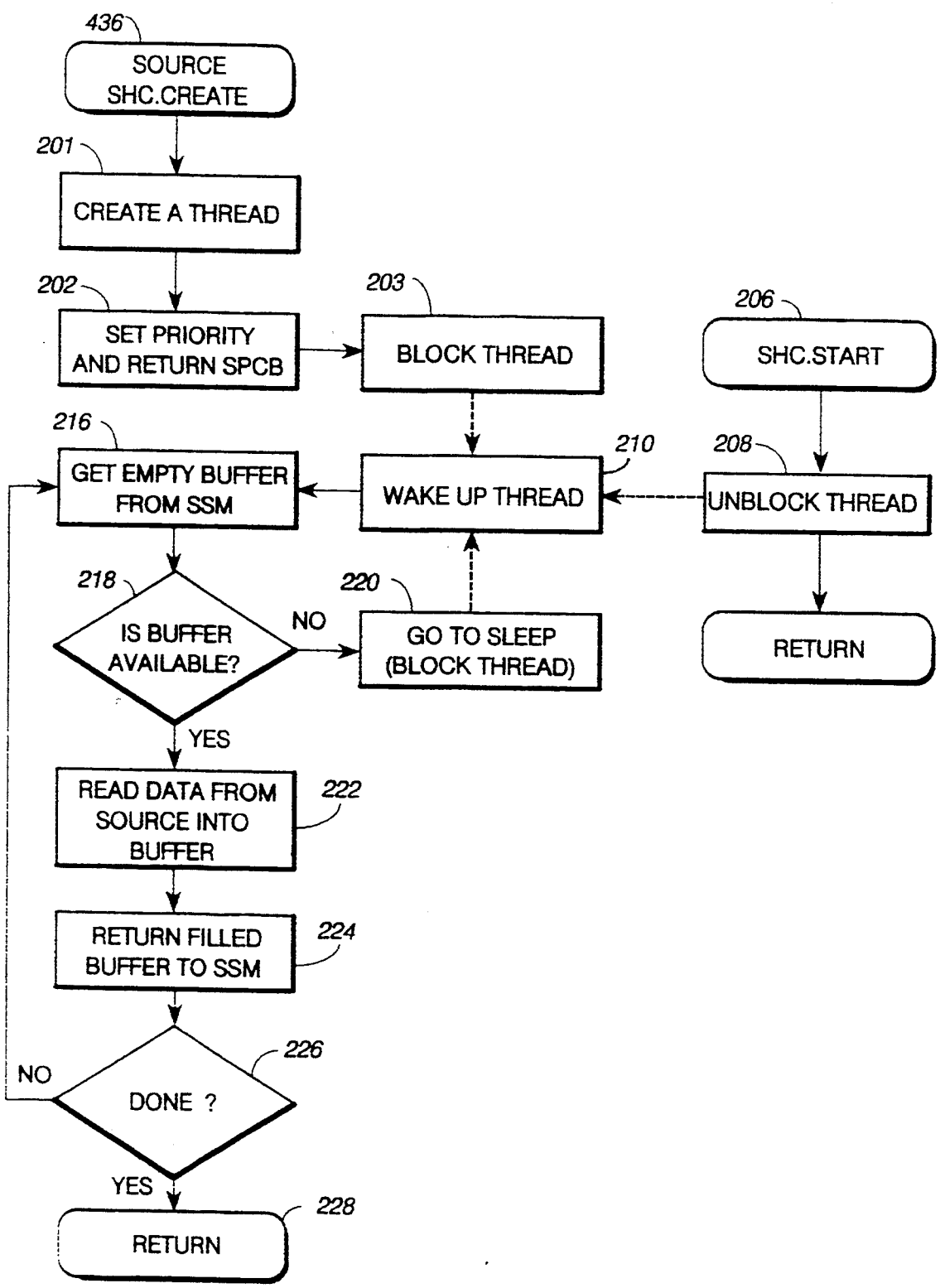
FIG. 6 is a flow chart illustrating source handling steps for creating and operating a data stream.

FIG. 6 illustrates what happens when the SHC.CREATE command is executed by a DLL source stream handler 152. First, step 201 creates a thread under the OS which will be controlled by the multitasking features of the OS. Step 202 assigns a priority level to the thread as appropriate to the task to be performed and returns a valid SPCB to the SSM for use in negotiation, then the source handler thread is blocked on a semaphore in step 203 and the source handler goes to "sleep". The priority level may be used to control the rate at which the OS dispatches and executes the thread. If discontinuities arise, priority levels may be adjusted. It is to be noted that in accordance with the standard operation of OS/2, the threads are treated as individual tasks, and control returns to the OS when the threads are blocked, when calls are made, when returns are made, etc. This allows the operating system to execute other tasks in the system and to return to the streaming threads, on a multitasking basis.

In response to a start stream call being made in the application program, manager 114 sends (via steps 436 and 438—FIG. 4) SHC.START commands first to the source thread handler and then to the target stream handler. The source stream handler needs to be started first to fill stream buffers before the target handler can use the data being transferred thereto. In response to receiving such command in step 206 (FIG. 6), the source stream handler in step 208 unblocks the source thread. In response to being unblocked or awakened in step 210, source thread then requests, in step 216, an empty buffer from manager 114. If an empty buffer is not available, as determined in step 218, step 220 then blocks the thread again. If an empty buffer is available, then step 222 reads data from the source device and fills the buffer. Step 224 then returns the filled buffer to manager 114. Step 226 decides if any more buffers need filling. If so, a branch is made back to step 216 and a loop is formed from steps 216–226 which loop is broken when step 226 decides no more buffers need filling. Then, the thread is blocked. Once the streaming operation has been started, the buffer filling process repeats until the end of the source file is reached at which point the source thread quiesces.

Figure 7:
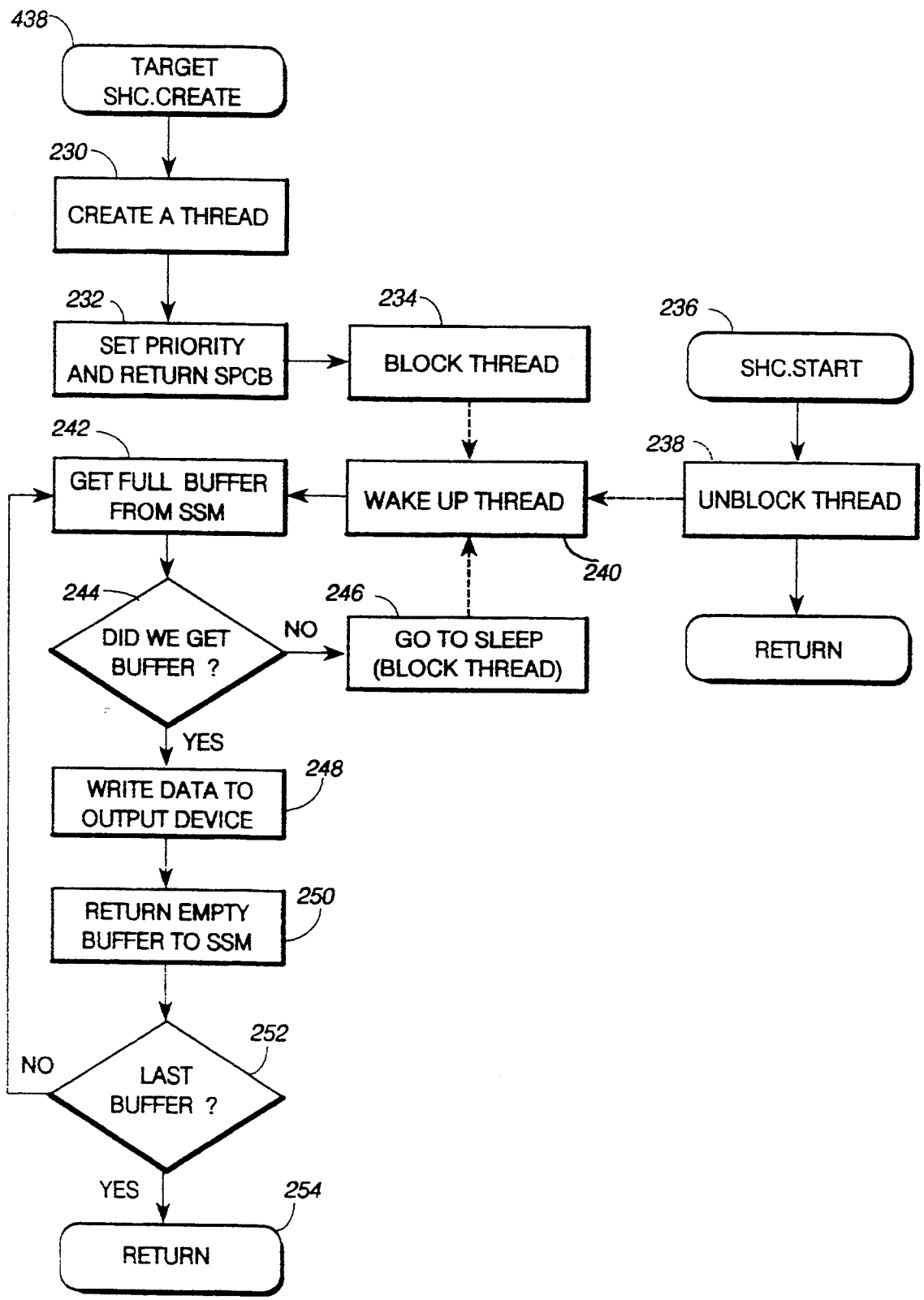
FIG. 7 is a flow chart illustrating target handling steps for creating and operating a data stream.

FIG. 7 illustrates operating the DLL target stream handler 154 at ring 3 privilege level. Target stream handler 154 receives from manager 114 an SHC.CREATE command to create a target data stream. A target stream thread is created in step 230. The stream handler then assigns a priority to the thread, returns a valid target SPCB in step 232, and blocks the target thread on a semaphore in step 234. When the target thread is awakened by manager 114 issuing a SHC.START command in step 236, the target thread is unblocked in step 238 to awaken the thread in step 240. Step 242 attempts to get a full buffer from the data stream. Step 244 checks to see if a buffer is obtained, and, if not, step 246 blocks the target thread. If a full buffer is obtained, step 248 writes the data in the buffer to the target device and then returns an empty buffer in step 250 to manager 114. Step 252 checks to see if the buffer is the last buffer in the data stream i.e. has the end of stream (EOS) been reached. If not, a branch is made back to step 242 to repeat the process of getting a full buffer. The loop repeats until the end of stream is detected, whereupon step 244 returns to the application.

STREAM PROTOCOL

To ensure that the data being processed streams in a continuous manner, each controlling SPCB (163 and 165) associated with the stream is set up to contain information used to allocate the buffers. (i.e., the number of buffers, the buffer size, and values indicating when to start the stream handlers). This information is important because dependent on the type of data being streamed, the amount and size of buffers must be optimum to ensure that continuous streaming of data occurs, and at the same time, ensure that the system resources are not over used (e.g. allocate more memory than is actually needed). Along with the allocation of memory, the values used to start the stream handlers ensure that enough buffers are filled by the source stream handler so that the target stream handler can be started and assured that there is enough data buffered up to allow real-time data streaming to occur.

The stream protocol defines several key operational parameters that control the behavior of a data stream. The application can query, install or deinstall a specific SPCB from a stream handler. Each stream handler supports one or more stream protocols. An SPCB is uniquely identified by a SPCB key. One field of an SPCB key allows the stream handler to have multiple SPCB's installed for the same data type. This field can be used by an application to specify which SPCB, for any data type, it wants to use. Each application in the system could define a different SPCB for the same data type. The application can modify a stream protocol by installing a new SPCB and deinstalling the old SPCB.

The fields and parameters in an SPCB are:

1. SPCB Length—(SPCBLEN) Length of SPCB structure.

2. SPCB Key—(SPCBKEY) Data stream type and internal key. The internal key is used to differentiate between multiple SPCB's of the same data stream type. This field specifies:
   a. Data type (DATATYPE), e.g. waveform or MIDI.
   b. Data subtype (DATASUBTYPE), e.g. 16-bit stereo PCM.
   c. Internal key (INTKEY). This is used to differentiate between plural SPCBs of the same data type and subtype.

3. Data Flags—(DATAFLAGS) Attributes of the data type. (i.e. specifies whether data or time cue points and seeking are supported by this data type). The data flags are:
   a. SPCBDATA_CUETIME—indicates the data type can support time cuepoint events.
   b. SPCBDATA_CUEDATA—indicates data type can support data cuepoint events.
   c. SPCBDATA_NOSEEK—indicates seeking cannot be done on the data type.

4. Number of Records—(NUMREQ) Maximum number of records per buffer. (This is only valid for split streams).

5. Data Block Size—(BLOCKSIZE) A block is an atomic piece of data. For example, for digital audio data type PCM stereo at a 44.1 KB sampling rate, the block size is four bytes.

6. Data Buffer Size—(BUFSIZE) Size of buffer to be used while streaming. Maximum buffer size is 64 KB.

7. Minimum Number of Buffers—(MINBUF) Minimum number of buffers needed to maintain a constant data stream.

8. Maximum Number of Buffers—(MAXBUF) For normal streams, this means the number of buffers that will be allocated for the stream. For user provided buffer streaming, this means the number of buffers that the SSM 114 can queue up for a consumer. This can be used by a source stream handler that gives the same set of buffers to the SSM 114 repeatedly. If the number of buffers is set to the number of buffers in the set minus one, the source stream handler is able to detect when the target stream has consumed a buffer and the buffer can be reused. The set of allocated buffers is an ordered set and each buffer is used in the same order each time.

9. Source Start Number—(SRCSTART) Number of empty buffers required to start the source stream handler. The value should be at least a big as the maximum number of buffers that would be requested by the source stream handler.

10. Target Start Number—(TGTSTART) Number of full buffers required to start the target stream handler. This value should be at least as large as the maximum number of buffers that would be requested by the target stream handler. Usually, a target will require at least two buffers at the start of streaming.

11. Buffer Flags—(BUFFLAGS) Buffer attributes (i.e. user provided buffers, fixed block size, interleaved data type, maximum buffer size). The buffer flags are:

a. SPCBBUF_USERPROVIDED—User provides buffers for streaming. SSM will not allocate buffers but will attempt to lock user provided buffers or copy the data to locked buffers. Using this flag affects streaming performance. Only a source stream handler can set the flag. The flag is mutually exclusive with an interleaved flag and a fixedbuf flag cannot be used with this flag set.

b. SPCBBUF_FIXEDBUF—The buffer size for this stream handler must be a particular fixed size for the particular data type. The flag cannot be used with the userprovided flag. The interleaved flag (split stream) implies a fixedbuf flag.

c. SPCBBUF_NONCONTIGUOUS—Each data buffer is allocated contiguously in physical memory unless both stream handlers set this flag. The flag allows the system flexibility in allocating memory.

d. SPCBBUF_INTERLEAVED—Indicates the stream is a split stream having an input stream of one data type which is split into plural streams of individual data types. Only the source stream handler can set this flag. It is mutually exclusive with the userprovided flag. The fixedbuf flag cannot be used when this flag is set.

e. SPCBBUF_MAXSIZE—Indicates a data buffer size field contains the maximum size buffer that this stream handler can handle.

f. SPCBBUF_16MEG—Stream buffers may be allocated above a 16 MB address for use by device driver supporting greater than 16 MB addresses.

12. Handler Flags—(HANDFLAGS) Stream handler flags (i.e. handler can receive sync pulses, use SSM 114 timer as master, non-streaming handler (NULL handler)). The flags are:

a. SPCBHAND_GENSYNC—This stream handler can generate sync pulses.

b. SPCBHAND_RCVSYNC—This stream handler can receive sync pulses.

c. SPCBHAND_NONSTREAM—This stream handler is a non-streaming handler which can participate in synchronization but does not stream.

d. SPCBHAND_GENTIME—The stream handler can keep track of real stream time which is done by keeping track of how much data is transferred to the target device.

e. SPCBHAND_NOPREROLL—A recording stream cannot preroll its device. Prerolling is the process by which a source handler initially fills a predetermined number of buffers before starting the target stream.

f. SPCBHAND_NOSYNC—This stream can be in a sync group but does not receive or generate sync pulses.

g. SPCBHAND_PHYS_SEEK—This stream handler does a seek to a physical device.

13. Resync Tolerance—(MMTIMETOLERANCE) Resync tolerance value. It is used to determine whether to send a sync pulse to this specific slave stream handler, if it is a slave.

14. Sync Pulse Granularity—(MMTIMESYNC) Used to save sync pulse generation granularity if this stream handler is a master, but can't generate its own sync pulse.

15. Bytes Per Unit of time—(BYTESPERUNIT) This is used to do seeks on linear data that is not compressed or of variable length. Also used for SHC_GETTIME queries in a stream handler.

16. MMTIME Per Unit—(MMTIMEPERUNIT) The amount of MMTIME each unit represents. This is also used for the seek and gettime functions of a stream handler. MMTIME is expressed in integer values of time units of a predetermined amount, e.g. 1/3000th of a second.

Except for the SPCB length and SPCB key fields, all of the above fields are subject to negotiation and can be changed to create the source and target controlling SPCBs.

When the system is initially configured, a system file called SPI.INI is created which contains a list of stream handlers and device drivers. Such file also contains predefined SPCBs for each of the handlers. The file can be accessed to return a list of stream handler names. The file can then be accessed using a handler name to return a stream handler ID and, at the same time, dynamically bind (i.e., install) the SPCB(s) associated with a stream handler. The file can also be used to determine which data types a given stream handler can process.

STREAM PROTOCOL NEGOTIATION

As previously indicated relative to FIG. 4, the stream handlers stored in the system have predefined SPCBs which are accessed during stream creation and are used during stream protocol negotiation to create a negotiated SPCB. The negotiated SPCB is then copied to create source SPCB 163 and target SPCB 165 (FIG. 3). These latter SPCBs are returned to the respective handlers and are the SPCBs that are actually used to control the data streaming. The predefined SPCBs are not used to directly control data streaming. In response to creating the controlling SPCBs, the source and target handlers look at information in such SPCBs and adjust themselves (the handlers) to perform the functions in accordance with the values of the parameters set forth in the SPCBs. The following are rules used during stream protocol negotiation to create the negotiated SPCB:

1. The following handler flags are set On in the negotiated SPCB for the stream handler that should perform the function indicated by the flag. Either the source or the target negotiated SPCB contains these set bit flags:
    a. SPCBHAND_GENSYNC
    b. SPCBHAND_RCVSYNC
    c. SPCBHAND_GENTIME
    d. SPCBHAND_PHYS_SEEK 2. A generic data type matches any other data type during negotiation. This is useful for stream handlers like the file system stream handler which is a generic data type that can be a source for almost any data type. In contrast, a audio stream handler has a plurality of control blocks specifying audio data types having different attributes such as 44K sampling rate, 20K sampling rate, MIDI, etc.

3. If neither of the SPCB key data types are generic then both the data type and subtype fields must match or an error will occur. The internal key field is not used during negotiation. An internal key of 0 is returned from negotiation.

4. The block size default to one byte if not specified. The source and target block size fields must match or the negotiation fails.

5. The data buffer size must be an integral multiple of block size.

6. The negotiation fails if one stream handler has a fixed buffer size SPCBBUF_FIXEDBUF greater than the maximum buffer size SPCBBUF_MAXSIZE of the other.

7. Both handlers must not have fixed buffer sizes (SPCBBUF_FIXEDBUF) of different lengths.

8. Both handlers must not have maximum buffer sizes SPCBBUF_MAXSIZE of different lengths.

9. Negotiation defaults to a fixed buffer size SPCBBUF_FIXEDBUF. Otherwise, the buffer size is set to the greater of the two SPCB buffer sizes but not less than the maximum buffer size SPCBBUF_MAXSIZE if one is specified.

10. If no special conditions (SPCBBUF_USERPROVIDED, SPCBBUF_FIXEDBUF, SPCBBUF_MAXSIZE) are specified, the largest buffer size is the one that is used for the stream creation.

11. For user provided buffers, the buffer size is set to the maximum buffer size or to the largest buffers possible rounded to a multiple of block size.

12. For split streams, the negotiated SPCB must have a maximum number of records per buffer greater than 0. The source SPCB supplies this value and the target SPCB does not. The target SPCB must always be 0.

13. The maximum and minimum number of buffers must be greater than 0.

14. The largest minimum number of buffers value is used.

15. The largest maximum number of buffers value is used.

16. SSM 114 attempts to allocate the maximum number of stream buffers requested. If it is unable to allocate this amount of space, but is able to allocate the minimum needed, the stream is created. Otherwise, the stream creation is rejected.

17. The number of EMPTY buffers required to start the source is always taken from the source SPCB.

18. The number of FULL buffers required to start the target is always taken from the target SPCB.

19. For SpiGetTime requests, each handler must specify whether it can receive these requests and return real-time information. It can do this by specifying the SPCBHAND_GENTIME flag. For negotiation, the target stream handler is the default provider of this information unless only the source can provide this information.

20. The Bytes Per Unit and MMTIME Per Unit are set from the stream handler that handles the real-time requests per the previous statement.

21. For sync pulses, each handler must specify whether it can send or receive sync pulses. It can do this by specifying the SPCBHAND_GENSYNC or SPCBHAND_RCVSYNC flag. For negotiation, the target stream handler is the default generator/receiver of sync pulses unless only the source can generate/receive sync pulses.

22. The sync tolerance is only valid for handlers that set the SPCBHAND_RCVSYNC.

23. The sync pulse granularity is only valid for handlers that set the SPCBHAND_GENSYNC. Any undefined bit in any bit flag of the stream protocol must be set to zero.

24. The SPCBHAND_PHYS_SEEK flag is used to specify if a stream handler does a physical device seek when called. SSM 114 uses this information to determine which stream handler should be called. The handler that does a physical device seek will be called first. Otherwise, the stream handler that specified SPCBHAND_GENTIME is called first.

25. Any reserved fields are set to NULL.

26. Any undefined bit in any bit flag of the stream protocol must be set to 0.

Figure 8:
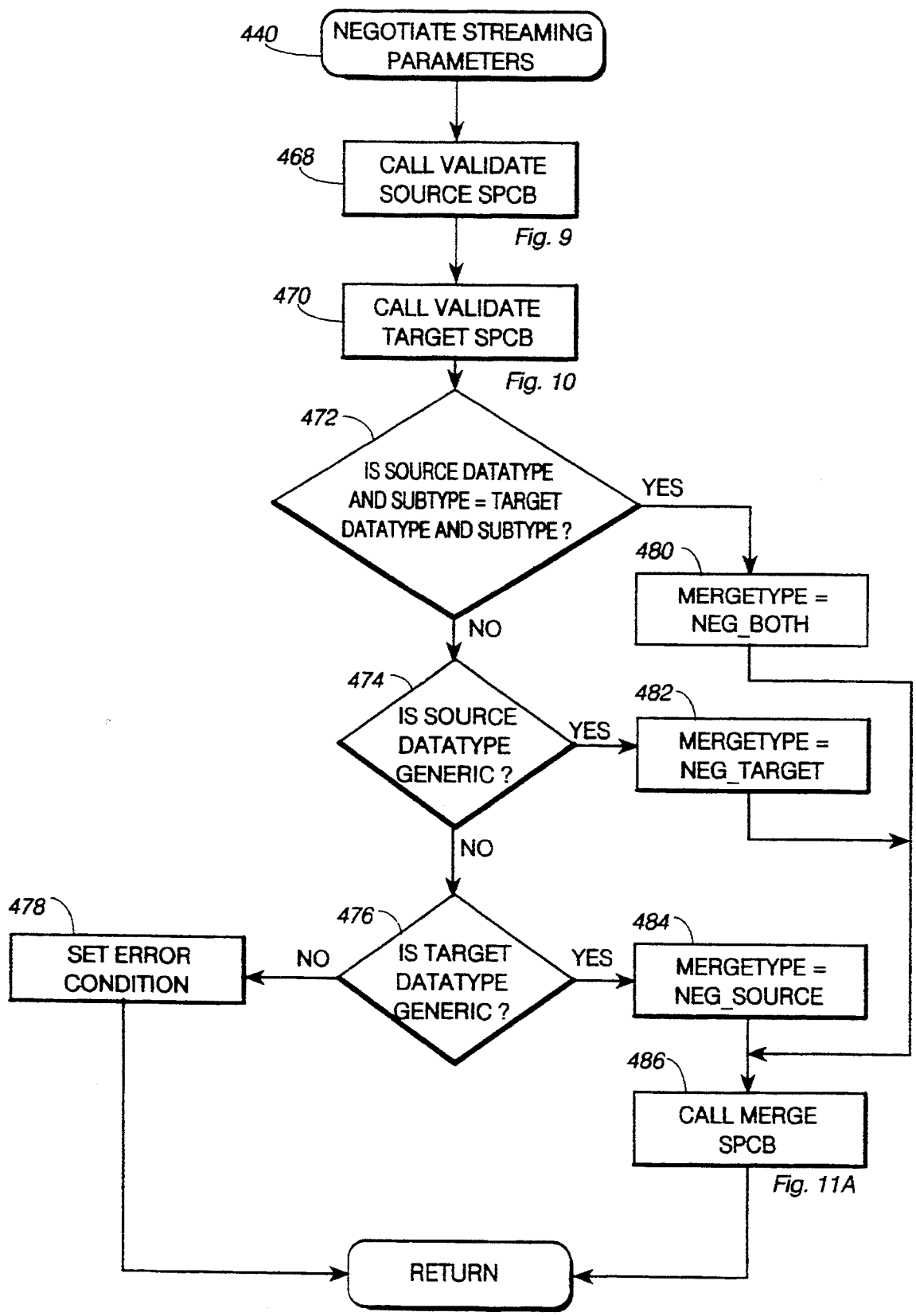
FIG. 8 is a flow chart of a routine for negotiating streaming parameters.

The negotiation process is illustrated in more detail in FIGS. 8–17C. Referring to FIG. 8, when the negotiate parameters routine is called in step 440, step 468 first validates the source SPCB by calling a routine described below with reference to FIG. 9. Validation is a process for preventing the use of erroneous data wherein each data item is compared with allowable values and ranges and only those items within such values and ranges can be used. Step 470 then validates the target SPCB as described relative to FIG. 10. Step 472 then decides by accessing the datatype and subtype fields in the source and target SPCBS whether the source datatype and subtype are the same as those of the target. If not, step 474 decides if the source datatype is generic. If the source datatype is not generic, step 476 decides if the target datatype is generic. If it is not, step 478 sets an error condition and a return is made to the caller. If steps 472, 474, and 476 result in positive determinations, steps 480, 482, and 484 respectively set the mergetype to NEG_BOTH, NEG_TARGET, and NEG_SOURCE. Step 486 follows completion of any of steps 480, 482, and 484 and calls the merge SPCB routine which merges data from the target SPCB and the source SPCB and produces a resultant negotiated SPCB. Afterwards, a return is made to the caller.

Figure 9:
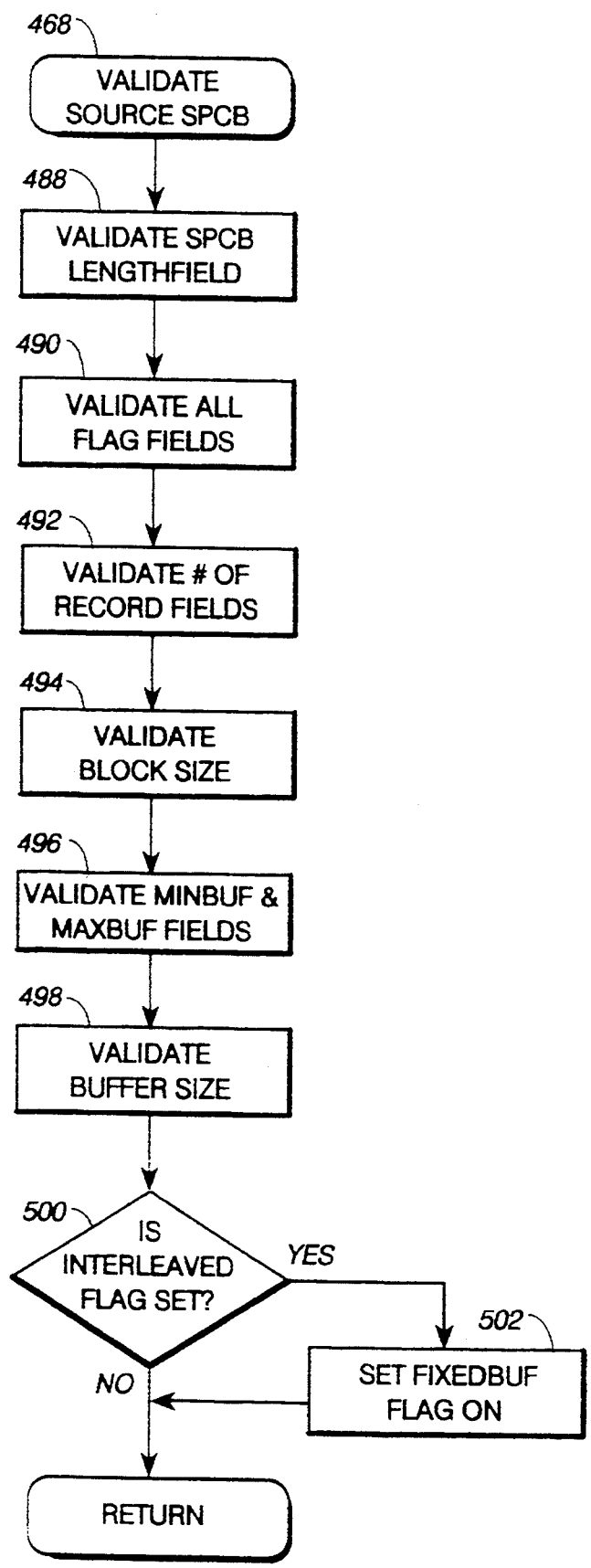
FIG. 9 is a flow chart of a routine for validating a source SPCB.
Figure 10:
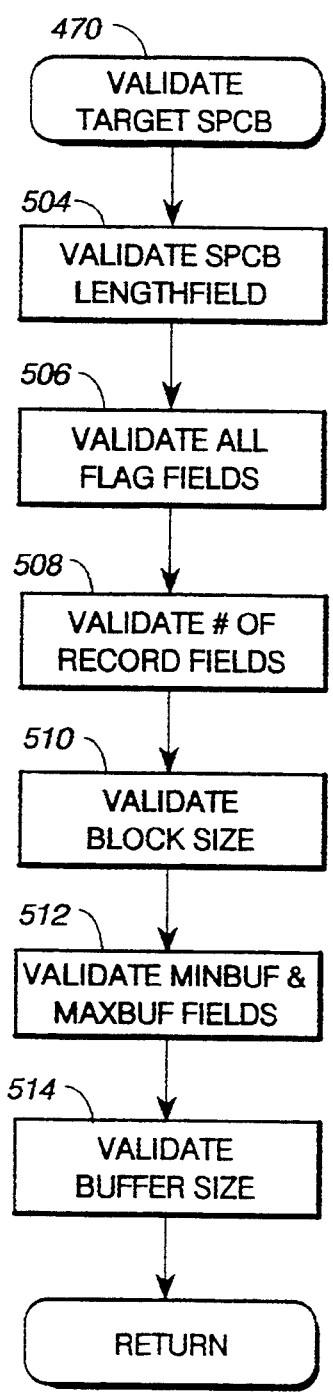
FIG. 10 is a flow chart of a routine for validating a target SPCB.

As shown in FIG. 9, the validate source SPCB routine first validates the SPCB length field in step 488. This is followed by steps 490, 492, 494, 496, and 498 which respectively validate all flag fields, the number of record fields, block size, minbuf and maxbuf fields, and buffer size fields. Step 500 then looks at the interleaved flag to see if it is set. If the interleaved flag is not set, a return is made but if such flag is set, step 502 sets or turns on the fixedbuf flag before returning. The target SPCB validation process is shown in FIG. 10 and performs steps 504–514 to validate the listed target SPCB fields in a manner similar to steps 488–498 for validating source SPCB fields.

Figure 11A:
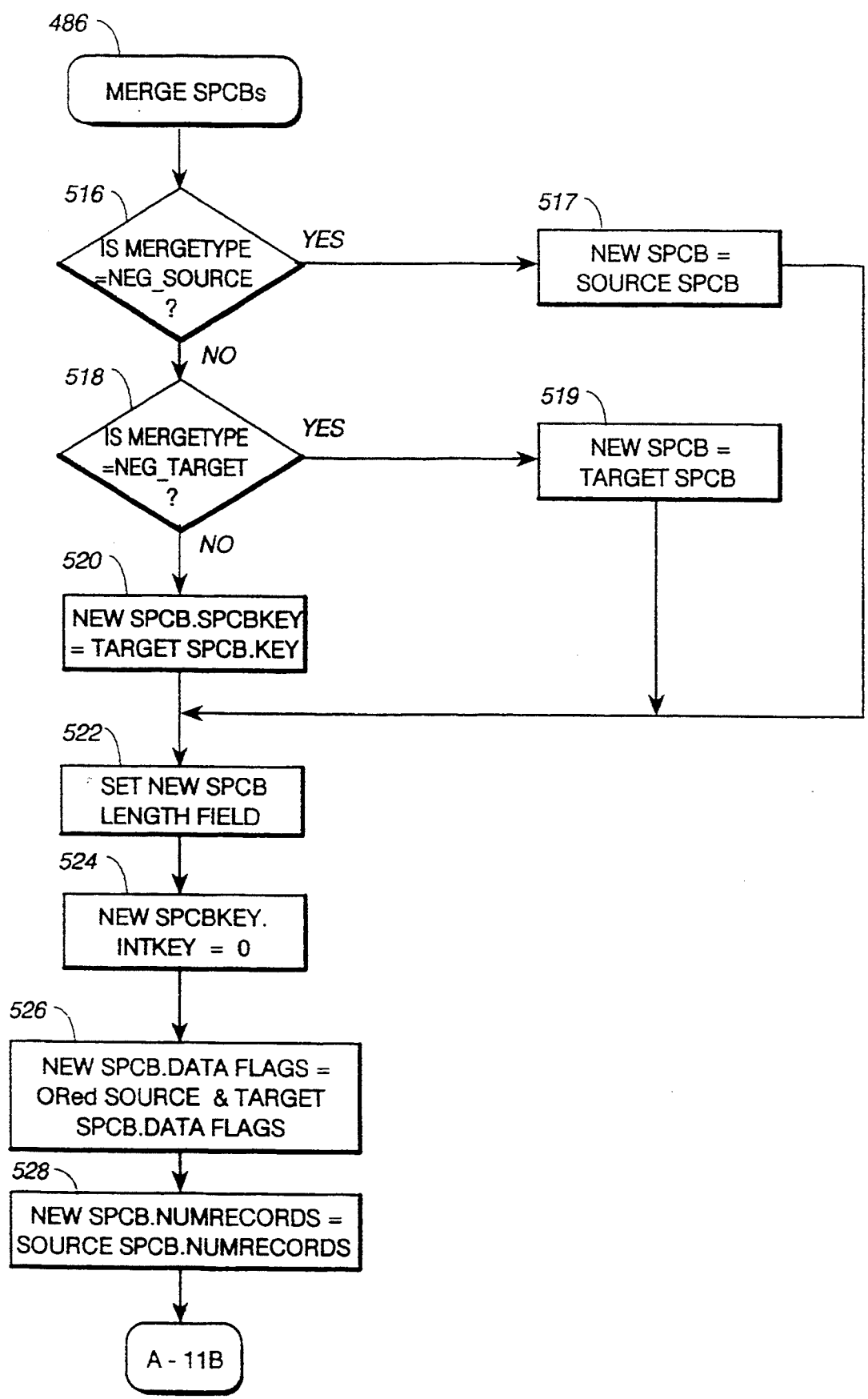
FIGS. 11A and 11B are a flow chart of a routine for merging SPCBs.
Figure 11B:
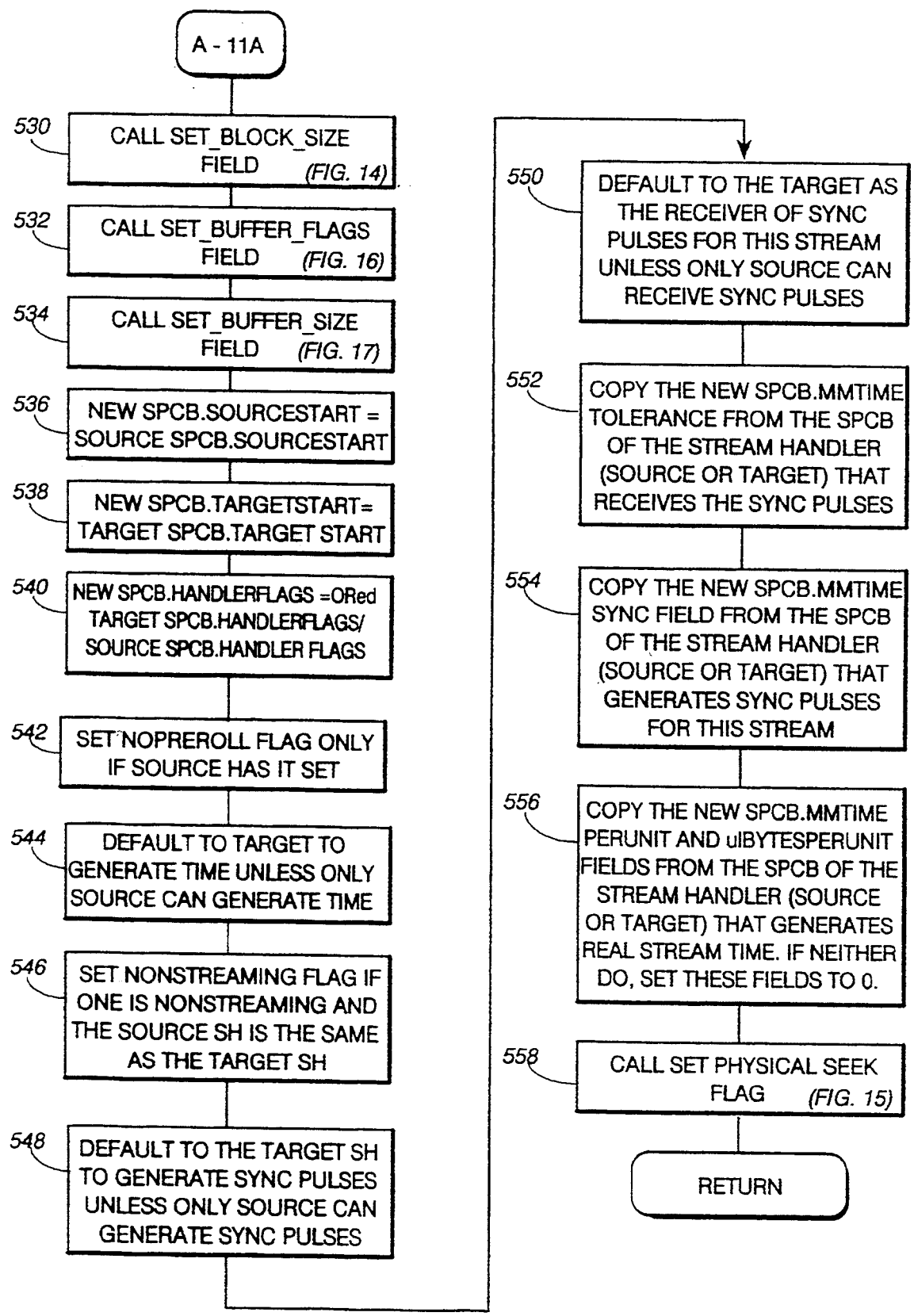

With reference to FIGS. 11A and 11B, information from the source and target SPCBs is merged to form the new or negotiated SPCB in the following manner. First, step 516 decides if the mergetype has been set to NEG_SOURCE. If not, step 518 decides if the mergetype has been set to NEG_TARGET. If not, the conclusion is reached that the mergetype is NEG_BOTH and step 520 then sets the new SPCB.KEY to equal the target SPCB.KEY. If step 516 results in a positive determination, step 517 sets the new SPCB to equal the source SPCB. That is, the source SPCB is copied to create a new SPCB having fields that are may be later changed during the negotiation process. If step 518 results in a positive determination, step 519 initially sets the new SPCB to be the same as the target SPCB. Step 522 follows completion either of steps 517, 519 or 520 and it sets the length field of the new SPCB in accordance with how many bytes are contained therein.

Step 524 then sets the new SPCBKEY.INTKEY (internal key) to zero. Step 526 then merges or sets the new SPCB.DATA flags to equal the logical ORing of the corresponding flags of the source and target SPCBs. Step 528 then sets the number of records field in the new SPCB to be the same as the number of record in the source SPCB. The bottom box in FIG. 11A is a drawing connector indicating the process continues through box A in FIG. 11B. Steps 530, 532 and 534 sequentially call the set block size field, set the buffer flags field, and set the buffer size fields, routines that are discussed below with reference to FIGS. 14, 16 and 17.

Steps 536 and 538 set the new SPCB.SOURCESTART and SPCB.TARGETSTART fields in accordance with the contents of the source and target SPCBs. Step 540 then merges the handler flags by setting the new SPCB.HANDLERFLAGS in accordance with logically ORing the corresponding fields of the source and target SPCBs. Step 542 sets on the NO-PREROLL flag only if the source has it set. Step 544 defaults to the target to generate time unless only the source can generate time. In step 546, the nonstreaming flag is set if one handler is nonstreaming and the source stream handler is the same as the target stream handler. Step 548 defaults to the target stream handler to generate sync pulses unless only the source can generate sync pulses. Step 550 defaults to the target stream handler as the receiver of sync pulses for the data stream unless only the source stream handler can receive sync pulses.

Step 552 copies the new SPCB.MMTIME tolerance from the stream handler of the source or target which handler receives the sync pulses. Step 554 copies the new SPCB.MMTIME sync field from the stream handler of the source or target which handler generates the sync pulses for the stream. Step 556 copies the new SPCB.MMTIMEPERUNIT and BYTESPERUNIT fields from the stream handler of the source or target which handler generates real stream time. If neither handlers generate such time, these fields are set to zero. Finally, step 558 calls the set physical seek flag routine (discussed relative to FIG. 15) and then a return is made to the caller.

Referring to FIG. 12, when the setup source SPCB routine is called, step 560 sets the source SPCB to equal the new SPCB. Step 562 sets the generate sync flag only if the source generates time. The receive sync flag is set in step 564 only if the source receives sync pulses for the stream, and the generate time flag is set in step 566 only if the source generates time. Finally, step 568 sets the physical seek flag only if the source can do a physical seek to a device, and then control returns to the caller. FIG. 13 illustrates steps 570-578 which perform functions for the target SPCB similar to those functions done in steps 560-568 for the source SPCB.

Figure 14:
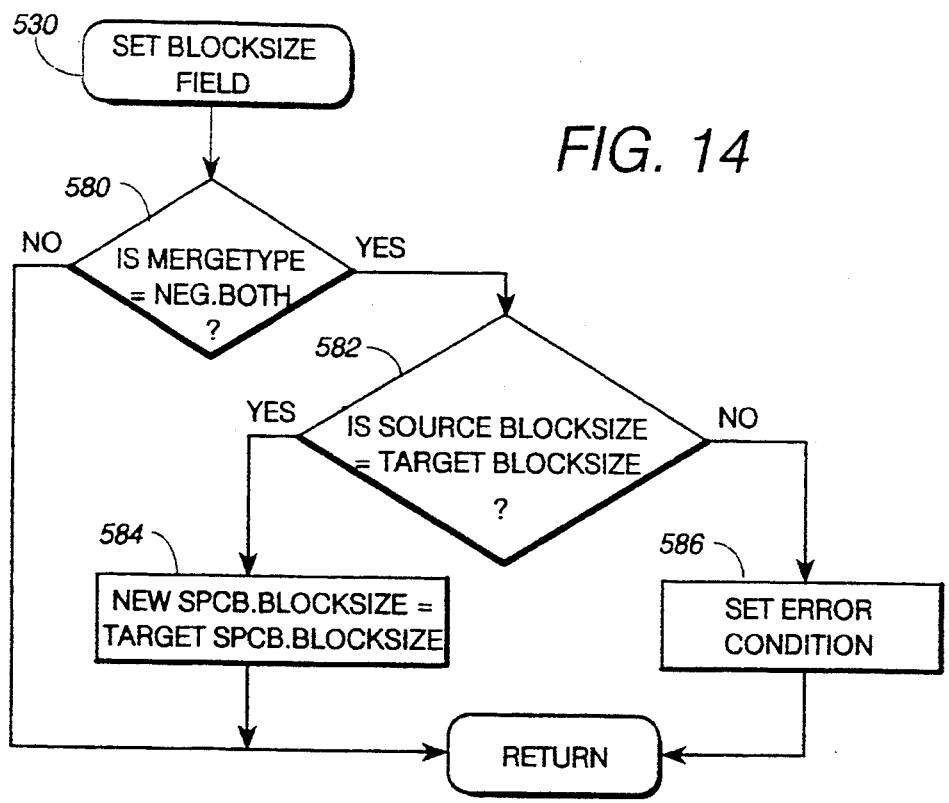
FIG. 14 is a flow chart of a routine to set a blocksize field.

When the set blocksize routine is called at 530, see FIG. 14, step 580 determines if the mergetype is set to NEG_BOTH. If not, a return is made to the caller and the BLOCKSIZE value defaults to the value initially placed or copied in the new SPCB. If the mergetype is NEG_BOTH, step 582 then decides if the source blocksize is equal to the target blocksize. If the two block sizes are the same, the new SPCB.BLOCKSIZE is set in step 584 from the target blocksize field. If the two block sizes are not the same, then step 586 sets an error condition and a return is made to the caller.

Figure 15:
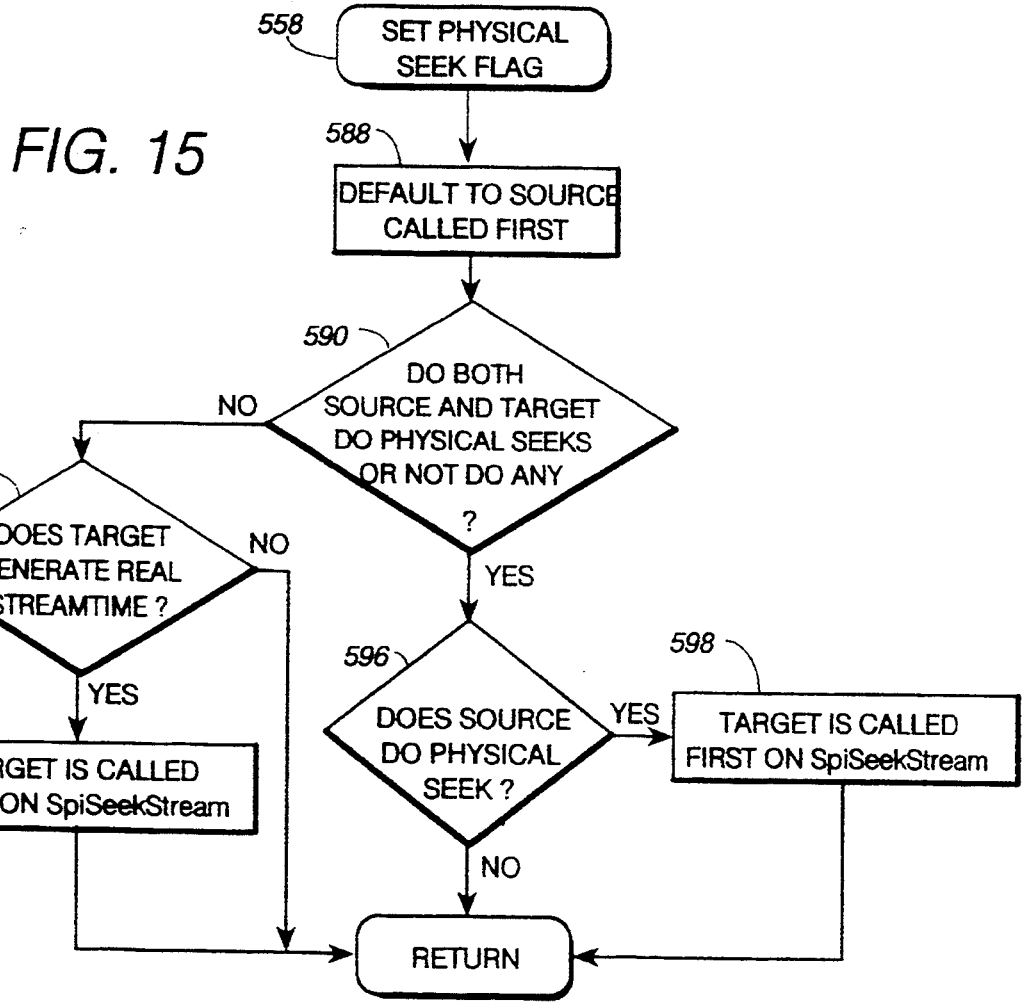
FIG. 15 is a flow chart of a routine to set a physical seek flag.

FIG. 15 shows the set physical seek flag routine 558 in which step 588 sets the SSM to a default condition in which the source handler is called first when the source need to do a physical seek. Step 590 determines if both the source and target perform physical seeks or if neither one does. If neither such condition is met, indicating that one or the other does a physical seek, step 592 decides if the target generates real stream time. If so, step 594 sets up condition so the target is called first on SpiSeekStream call. If the decision of step 592 is negative, or after step 594, a return is made. If step 590 results in a positive determination, step 596 decides if the source does a physical seek. If so, step 598 sets upon conditions so that the target is called first on SpiSeekStream. A return is made after steps 596 or 598.

Figure 16:
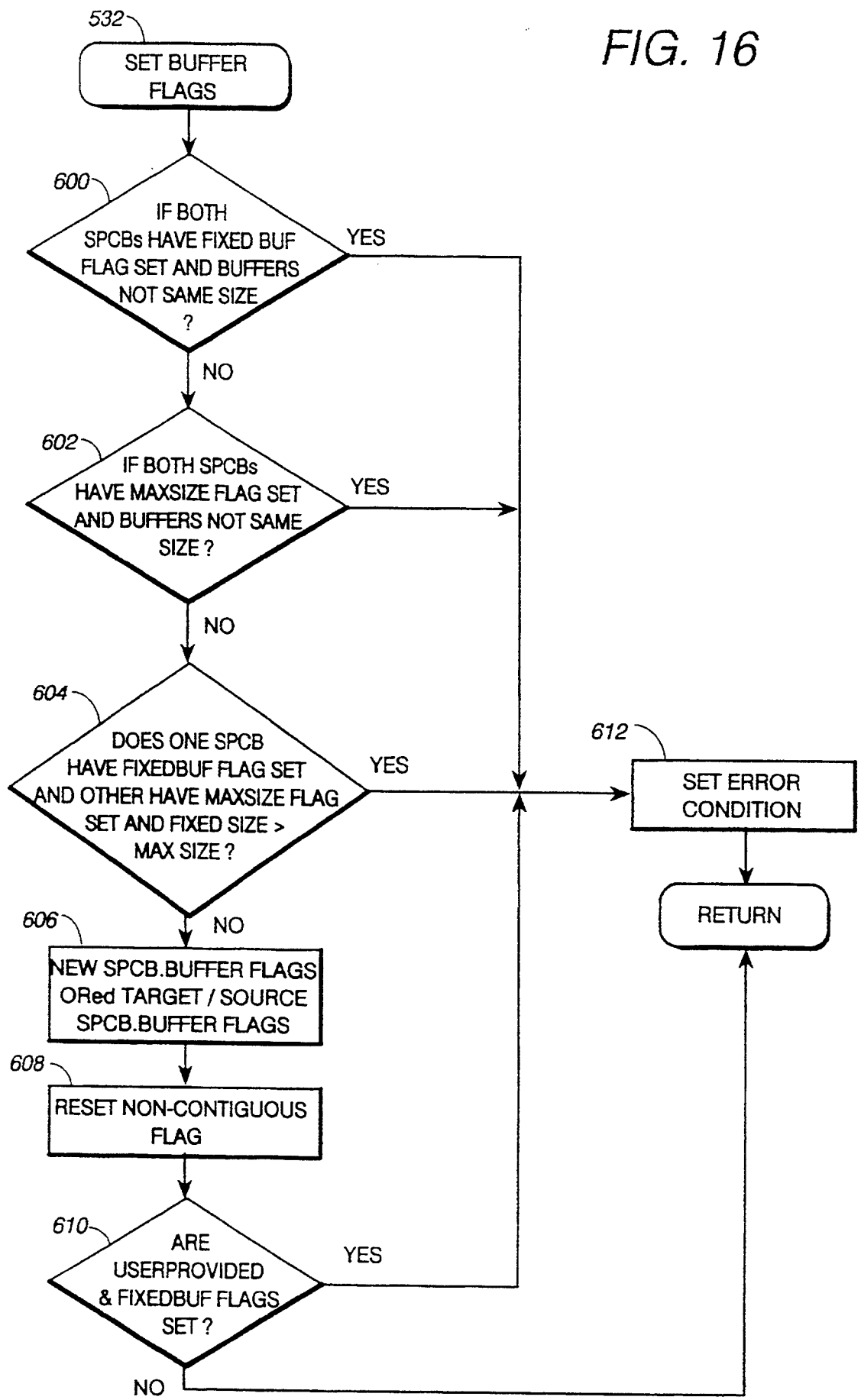
FIG. 16 is a flow chart of a routine to set buffer flags.

As shown in FIG. 16, upon calling set buffer flag routine 532, step 600 determines if both SPCBs have the fixed buf flags set and if the buffers are not the same size. If step 600 results in a NO decision, step 602 sees if both SPCBs have the maxsize flags set and if the buffers are not the same size. If step 602 produces a negative result, step 604 then determines if one SPCB has the fixedbuf flag set and if the other SPCB has maxsize flag set and the fixed size is set to the max size. If the result from step 604 is a NO, then step 606 sets the new SPCB buffer flags equal to the logical ORing of the target and source SPCB.BUFFER flags. Next, step 608 resets the noncontiguous flag and step 610 determines if the userprovided and the fixedbuf flags are set. If not, a return is made. If the results from any of steps 600, 602, 604, or 610 are positive, step 612 sets an error condition before returning to the caller.

Figure 17A:
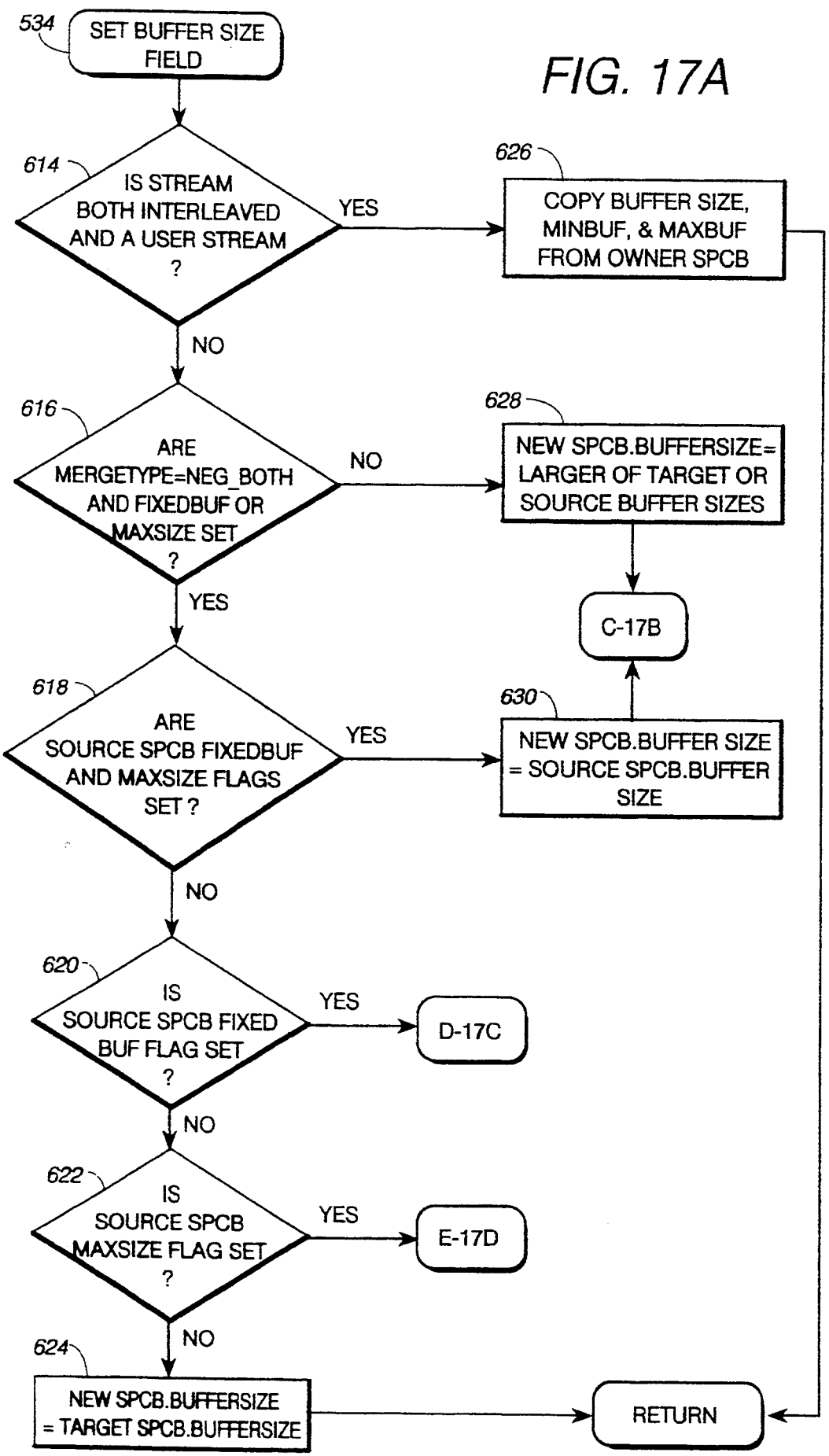
FIGS. 17A–17D are a flow chart of a routine for setting a buffer_size field.

Referring to FIG. 17A, the set buffer size field routine 534 begins with step 614 which decides if the stream is both interleaved and a user stream. If so, step 626 copies the buffer size, minbuf and maxbuf fields from the owner SPCB into the new SPCB and then returns. If step 614 produces negative results, step 616 decides if the mergetype is set to NEG_BOTH and if the fixedbuf or maxsize flags are set. If so, step 618 decides if the source SPCB fixedbuf and maxsize flags are set. If they are not set, step 620 checks to see if the source SPCB fixedbuf flag is set. If it is not set, step 622 checks to see if the source SPCB maxsize flag is set. If it is not set, step 624 sets the new SPCB.BUFFERSIZE from the target SPCB buffersize field and a return follows. If step 616 results in a negative determination, step 628 then sets the new SPCB buffersize field to the lager buffer size in either of the corresponding fields of the source or target SPCBs. If step 618 results in a positive determination, step 630 sets the buffer size field of the new SPCB in accordance with the setting of the source SPCB buffer size field. Following either steps 630 or 628, step 632 (FIG. 17B) is performed. Positive determinations from steps 620 and 622 causes steps 648 (FIG. 17C) and step 658 (FIG. 17D) to be performed.

Figure 17B:
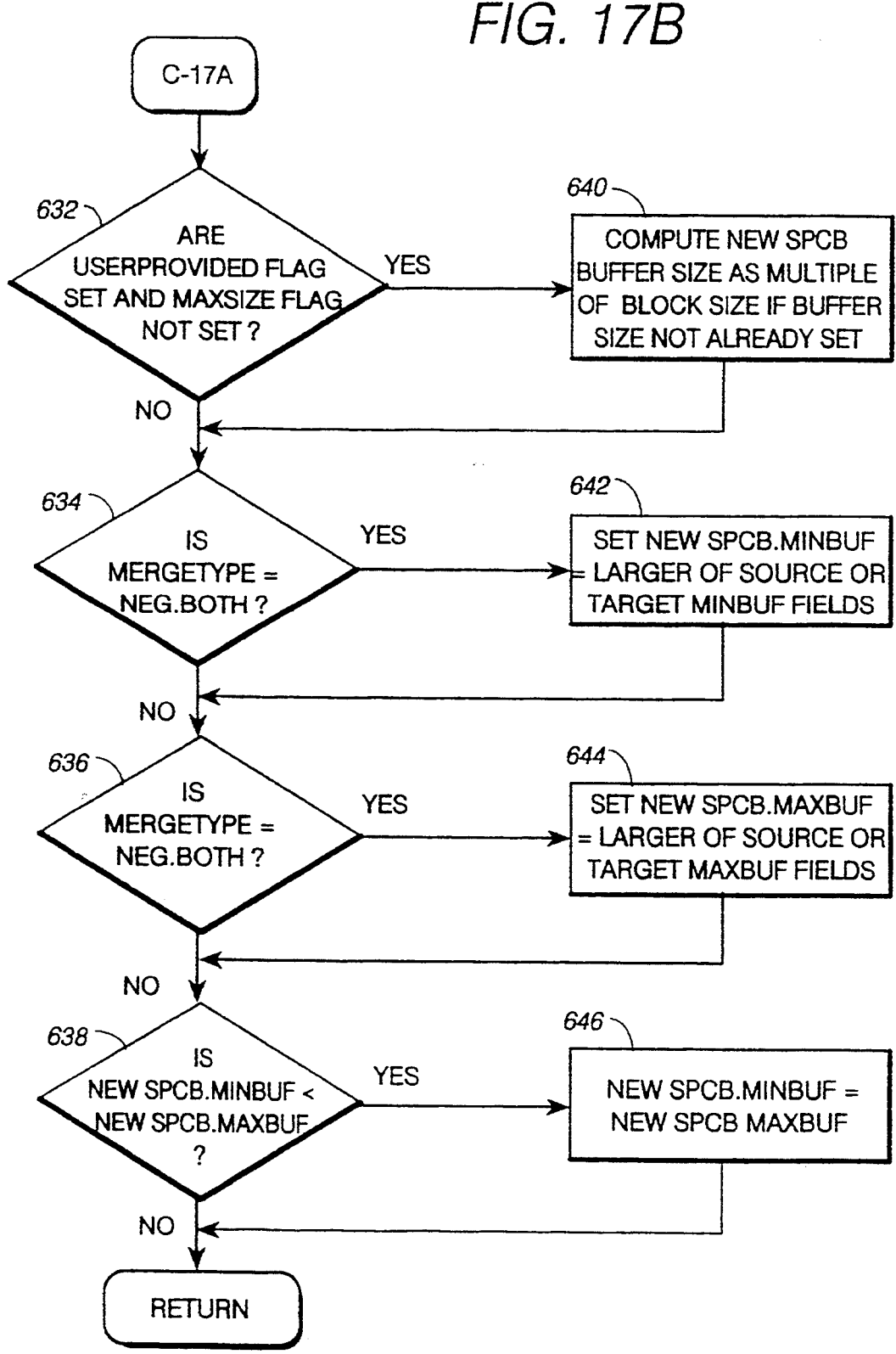

Referring to FIG. 17B, step 632 decides if the user provided flag is set and the maxsize flag is not set. If both conditions are true, step 640 computes the new SPCB buffer size as a multiple of the block size if the buffer size is not already set. Step 634 sees if the mergetype is set to NEG.BOTH. If so, step 642 sets the new SPCB minbuf field to be the larger of the source or target minbuf fields. Step 636 sees if the mergetype is set to NEG.BOTH. If so, step 644 sets the new SPCB maxbuf field to be the larger of the source or target maxbuf fields. Step 638 then checks to see if the minbuf field of the new SPCB is less than its maxbuf field and if so, step 646 then sets the minbuf field of the new SPCB to equal the maxbuf field thereof. Negative determinations from steps 632-638 simply causes the illustrated succeeding steps to be performed.

Figure 17C:
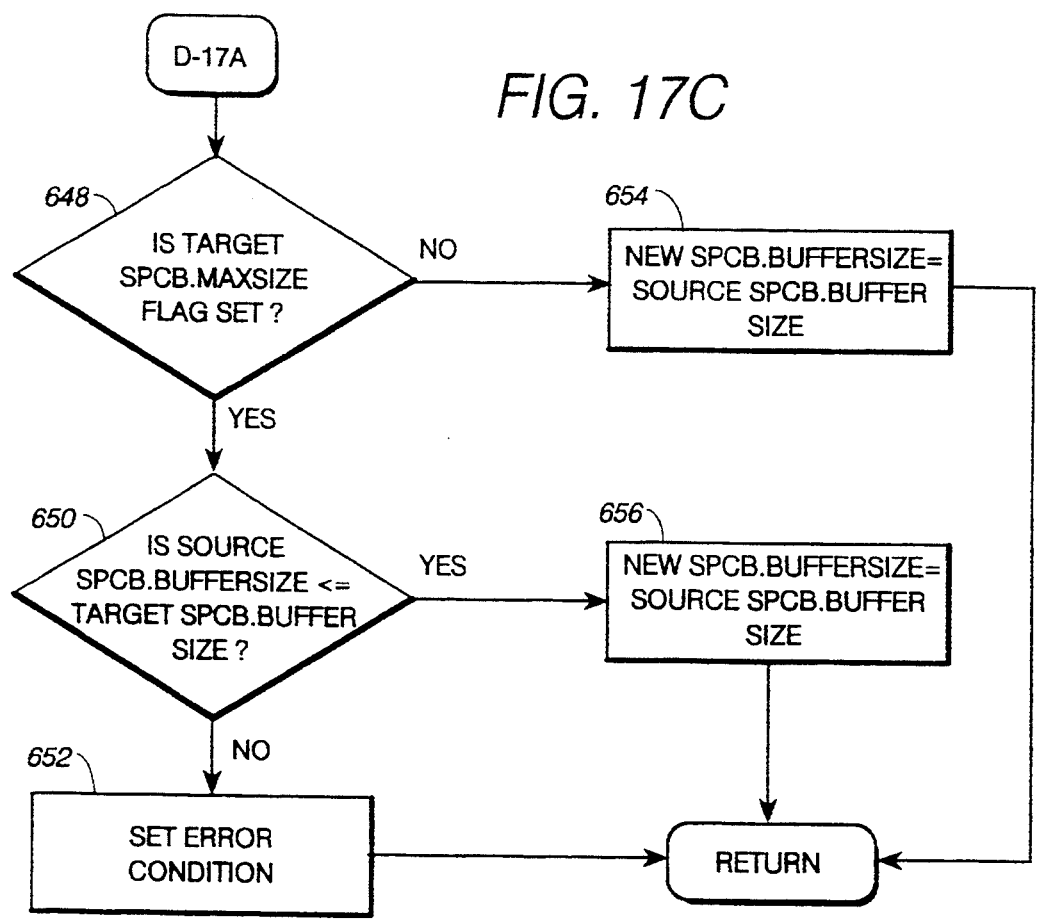
Figure 17D:
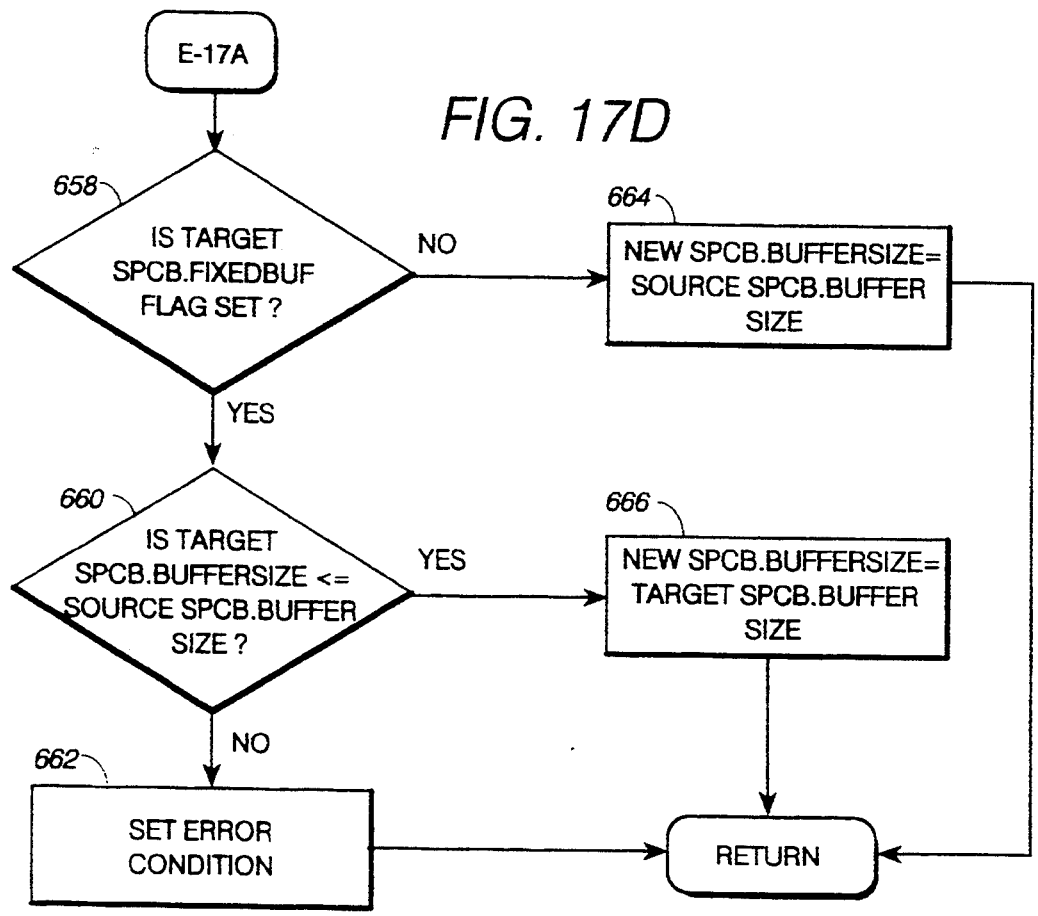

When step 648 in FIG. 17C occurs, the target SPCB.MAXSIZE flag is checked to see if it is set. If it is not set, step 654 then sets the new SPCB buffer size to equal the buffer size in the source SPCB and a return is made. If step 648 results in a positive determination, step 650 checks to see if the source SPCB buffersize is equal to or less than the buffer size of the target SPCB. If so, step 656 sets the new SPCB buffersize field to equal the source SPCB.BUFFERSIZE, before returning. If step 650 results in a NO, step 652 sets an error condition prior to returning.

Step 658 (FIG. 17D) decides if the target SPCB fixedbuf flag is set. If it is set, step 660 then determines if the buffersize in the target SPCB is equal to or less than the buffer size in the source SPCB. If so, step 686 sets the buffersize of the new SPCB to equal the buffer size in the target SPCB. If the result of step 660 is NO, step 662 sets an error condition prior to returning. If step 658 produces a negative result, step 664 then sets the buffer size of the new SPCB to equal the buffer size in the source SPCB.

It should be apparent to those skilled in the art that many changes can be made in the details and arrangements of steps and parts without departing from the scope of the invention as defined in the appended claims.

What is claimed is:

1. In a multimedia data processing system comprising a personal computer having processor and a storage system, said storage system including a memory for storing at least one multimedia application program and a multitasking operating system for execution by said processor, data streaming apparatus operable under said operating system and said application program for streaming data from a source device to a target device in accordance with a streaming protocol, said apparatus comprising:

a plurality of programmable stream handlers stored in said storage system and including at least one source stream handler and at least one target stream handler;

a plurality of predefined streaming protocol control blocks (SPCBs) stored in said storage system and including a first SPCB for said source stream handler and a second SPCB for said target stream handler;

each of said predefined SPCBs containing a plurality of fields for storing stream protocol parameters including data type, number of buffers needed to maintain continuous streaming of data, and size of buffers;

said source stream handler comprising a callable first routine for creating a source thread as a task under said operating system and blocking such source thread, and a callable second routine for unblocking said source thread and streaming data from said source device to said buffers;

said target stream handler comprising a callable third routine for creating a target thread as a task under said operating system and blocking such target thread, and a callable fourth routine for unblocking said target thread and streaming data from said buffers to said target device;

and stream manager means operable in response to execution of a stream create call instruction in said application program, to create a data stream by calling said first routine and said third routine to set up source and target threads as multitask threads under said operating system and block on such threads, creating a negotiated source SPCB and a negotiated target SPCB by negotiating differences between said first and second SPCBs, said negotiated source SPCB and said negotiated target SPCB defining a negotiated streaming protocol mutually acceptable to both said source handler and said target handler, and dynamically allocating in said memory a plurality of buffers for said data stream in accordance with said streaming protocol defined in said negotiated source and target SPCBs.

2. A multimedia data processing system in accordance with claim 1 wherein:

said stream manager means is operable in response to execution of a start stream call in said application program, to call said second and fourth routines to initiate data streaming and transfer data in accordance with said negotiated streaming protocol.

3. A multimedia data processing system in accordance with claim 2 wherein said stream protocol parameters include a plurality of buffer attribute flags, a plurality of data attribute flags, and a plurality of stream handler flags.

4. A multimedia data processing system in accordance with claim 3 wherein:

said stream manager means is operative to produce said negotiated SPCBs by selecting parameters from said first and second SPCBs in accordance with predefined rules of negotiation.

5. A multimedia data processing system in accordance with claim 4 wherein said data type parameters in said first and second SPCBs may be specified as a generic data type or as a specific data type, and said data type parameters in said negotiated SPCBs are set in accordance with said rules of negotiation to a generic type when either one of said first or second SPCBs specifies a generic data type and to a specific data type when both of said first and second SPCBs specify the same specific data type.

6. A multimedia data processing system in accordance with claim 5 wherein said system manager means produces an error indication when said first and second SPCBs specify different specific data types.

7. A multimedia data processing system in accordance with claim 4 wherein said data attribute flags indicate whether data or time cue points and seeking are supported by data type set forth in said negotiated SPCBs.

8. A multimedia data processing system in accordance with claim 7 wherein a SPCBHAND_PHYS_SEEK flag is used to specify if a stream handler does a physical device seek when called, said stream manager means being operative to first call such stream handler when said SPCBHAND_PHYS_SEEK flag is set.

9. A multimedia data processing system in accordance with claim 4 wherein said stream handler flags indicate whether each stream handler can participate in synchronization by receiving or generating sync pulses, or without streaming.

10. A multimedia data processing system in accordance with claim 8 wherein for sync pulses, each handler must specify whether it can send or receive sync pulses by setting SPCBHAND_GENSYNC and SPCBHAND_RCVSYNC flags, and in accordance with said rules of negotiation said target stream handler is set as a default generator/receiver of sync pulses unless only the source can generate/receive sync pulses.

11. A multimedia data processing system in accordance with claim 4 wherein said buffer attribute flags indicate user provided buffers, fixed block size, interleaved data type, and maximum buffer size.

12. A multimedia data processing system in accordance with claim 4 wherein said negotiated SPCBs contain size of buffer parameters that are set to the greater one of the size of buffer parameters contained in said first SPCB and said second SPCB.

13. A multimedia data processing system in accordance with claim 4 wherein said fields in said negotiated source SPCB include a field for specifying a maximum number of records per buffer which field is obtained for split streams from said first SPCB and is a value greater than 0.

14. A multimedia data processing system in accordance with claim 4 wherein said negotiated SPCBs include fields specifying the number of empty buffers required to start said source thread which number is always taken from said first SPCB, and said negotiated SPCBs further include fields specifying the number of full buffers required to start said target thread which number is always taken from said second SPCB.

15. A multimedia data processing system in accordance with claim 2 wherein:

said stream manager means is further operable in response to execution of said start stream call to call said second routine to fill a plurality of buffers with data from said source device, and to thereafter call said fourth routine to empty such filled buffers, said second routine and said fourth routine being thereafter operable to run both threads to alternately fill buffers with data and write data from said buffers until an end of data stream is reached.

16. A multimedia data processing system in accordance with claim 15 wherein said source handlers are operative to initially block said threads after said threads have been set up, and to thereafter unblock said threads in response to said start stream call thereby allowing said threads to transfer said data through said buffers.

17. A multimedia data processing system in accordance with claim 16 wherein said stream manager means controls use of said buffers by said threads whereby said stream manager means provides empty buffers to said source thread for filling with data from said source device, receives filled buffers from said source thread, provides filled buffers to said target thread for writing data therefrom to said target device, and receives empty buffers from said target thread.

18. A multimedia data processing system in accordance with claim 2 wherein said memory is a paged memory;

and said apparatus includes means operative after said buffers have been allocated to lock said buffers in said memory to prevent said buffers from being paged out while data streaming is occurring.

* * * * *